LOGIC NETWORKS FOR REALIZING ASSOCIATIVE LOGIC FUNCTIONS
Filed April 19, 1963 16 Sheets-Sheet 1
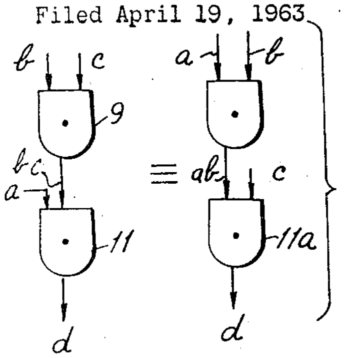
Fig. 1.
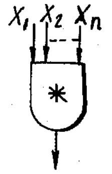
Fig. 2.
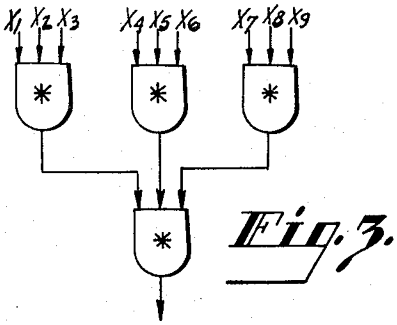
Fig. 3.
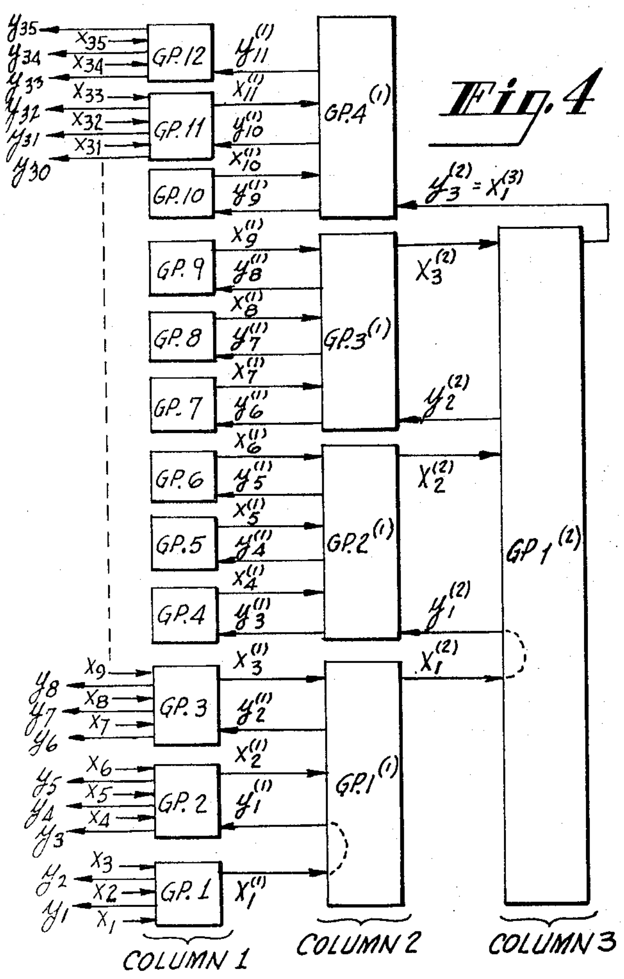
Fig. 4
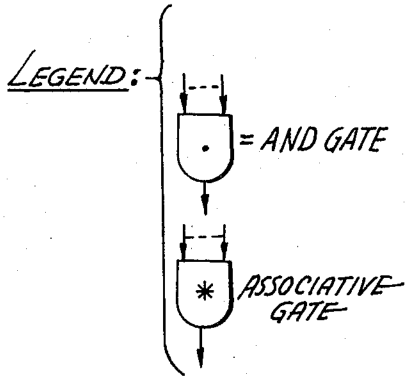
LEGEND: SEE FIG. 5. FOR CONTENTS OF EACH BLOCK
k=2 ; № OF COLUMNS = k+1 = 3
MAX DELAY = 2k+1 = 5 ; m = 3
INVENTOR.
ROBERT O. WINDER
BY
Samuel Cohen
Attorney LOGIC NETWORKS FOR REALIZING ASSOCIATIVE LOGIC FUNCTIONS
Filed April 19, 1963 16 Sheets-Sheet 2
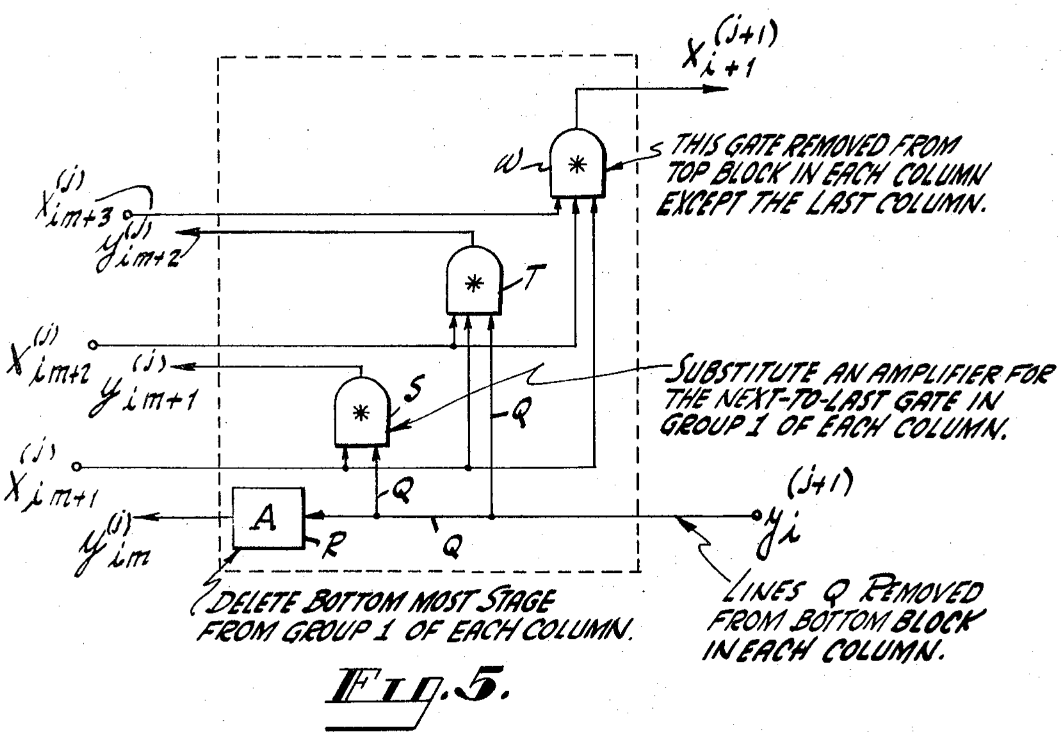
FIG. 5.
LEGEND:-
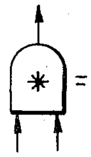
= STAGE WHICH PERFORMS A GIVEN ASSOCIATIVE LOGIC FUNCTION. MAXIMUM "FAN-IN" OR "FAN-OUT" PERMITTED = m = 3
[A] = AMPLIFIER. IF NOT REQUIRED FOR FAN-OUT PURPOSES, MAY BE DELETED
m: 3 = MAX. FAN-IN, FAN-OUT. MAXIMUM No OF STAGES, PER GROUP = m+1
INVENTOR.
ROBERT O. WINDER
BY
[signature]
Attorney INVENTOR:
ROBERT O. WINDER
BY
Attorney INVENTOR:
ROBERT O. WINDER
BY Samuel Cohen
Attorney March 7, 1967 R. O. WINDER 3,308,285

LOGIC NETWORKS FOR REALIZING ASSOCIATIVE LOGIC FUNCTIONS

Filed April 19, 1963 16 Sheets-Sheet 5

INVENTOR.
ROBERT O. WINDER
ATTORNEY

LOGIC NETWORKS FOR REALIZING ASSOCIATIVE LOGIC FUNCTIONS

Filed April 19, 1963

16 Sheets-Sheet 6

INVENTOR
ROBERT O. WINDER
Samuel Cohen
ATTORNEY

LOGIC NETWORKS FOR REALIZING ASSOCIATIVE LOGIC FUNCTIONS

Filed April 19, 1963 16 Sheets-Sheet 7

INVENTOR.
ROBERT O. WINDER
BY
Samuel Cohen
Attorney

INVENTOR.
ROBERT O. WINDER

LOGIC NETWORKS FOR REALIZING ASSOCIATIVE LOGIC FUNCTIONS

Filed April 19, 1963 16 Sheets-Sheet 9

INVENTOR.
ROBERT O. WINDER
BY
Attorney

March 7, 1967 R. O. WINDER 3,308,285

LOGIC NETWORKS FOR REALIZING ASSOCIATIVE LOGIC FUNCTIONS

Filed April 19, 1963 16 Sheets-Sheet 10

CODE FIG. 12a. FIG. 12b.

INVENTOR
ROBERT O. WINDER

ATTORNEY

March 7, 1967 R. O. WINDER 3,308,285

LOGIC NETWORKS FOR REALIZING ASSOCIATIVE LOGIC FUNCTIONS

Filed April 19, 1963 16 Sheets-Sheet 11

INVENTOR.
ROBERT O. WINDER
BY
Samuel Cole
Attorney

INVENTOR
ROBERT O. WINDER
BY Samuel Cohen
Attorney

March 7, 1967 R. O. WINDER 3,308,285

LOGIC NETWORKS FOR REALIZING ASSOCIATIVE LOGIC FUNCTIONS

Filed April 19, 1963 16 Sheets-Sheet 13

INVENTOR
ROBERT O. WINDER
BY Samuel Cohen
Attorney

INVENTOR.
ROBERT O. WINDER
BY
Attorney

March 7, 1967 R. O. WINDER 3,308,285

LOGIC NETWORKS FOR REALIZING ASSOCIATIVE LOGIC FUNCTIONS

Filed April 19, 1963 16 Sheets-Sheet 15

INVENTOR.
ROBERT O. WINDER
BY
ATTORNEY

LEGEND:
SEE FIG. 15. FOR CONTENTS OF EACH BLOCK.

INVENTOR.
ROBERT O. WINDER
BY
Samuel Cole
Attorney

United States Patent Office 3,308,285

Patented Mar. 7, 1967

3,308,285
LOGIC NETWORKS FOR REALIZING ASSOCIATIVE LOGIC FUNCTIONS

Robert O. Winder, Trenton, N.J., assignor to Radio Corporation of America, a corporation of Delaware Filed Apr. 19, 1963, Ser. No. 274,188
8 Claims. (Cl. 235—175)

This invention relates to logic networks and more particularly to multiple input, multiple output logic networks.

An object of the invention is to provide arrangements of logic elements which are suitable for realizing certain "associative" logic functions. The term "associative" implies that the manner of grouping the arguments (inputs in the case of electrical circuits) of the particular function does not affect the results which are obtained.

Another object of the invention is to provide networks of logic elements for realizing associative logic functions in which the gates making up the networks have reasonable "fan-in" and "fan-out" requirements. The term "fan-in" refers to the number of inputs a stage receives and the term "fan-out" refers to the number of outputs a stage can provide. Examples are given in the application of networks employing logic gates with maximum fan-in and fan-out requirements of 2 to 31. In any such network, the maximum fan-in and fan-out number, identified as $m$, may be fixed.

A third object of the invention is to provide a network of associative logic elements in which the number of stages through which a signal passes to produce an output signal is relatively low, so that the number of delay intervals required is relatively low. Specific figures are given later.

The invention is discussed in greater detail below and is shown in the following drawings of which:

FIG. 1 is a logic diagram to help explain the term "associativity";

FIGS. 2 and 3 are logical diagrams to help explain some of the limitations in present logical circuits;

FIG. 4 is a block circuit diagram of a logic system according to the present invention;

FIG. 5 is a block circuit diagram of the gates within the blocks of FIG. 3;

Figure 6A:
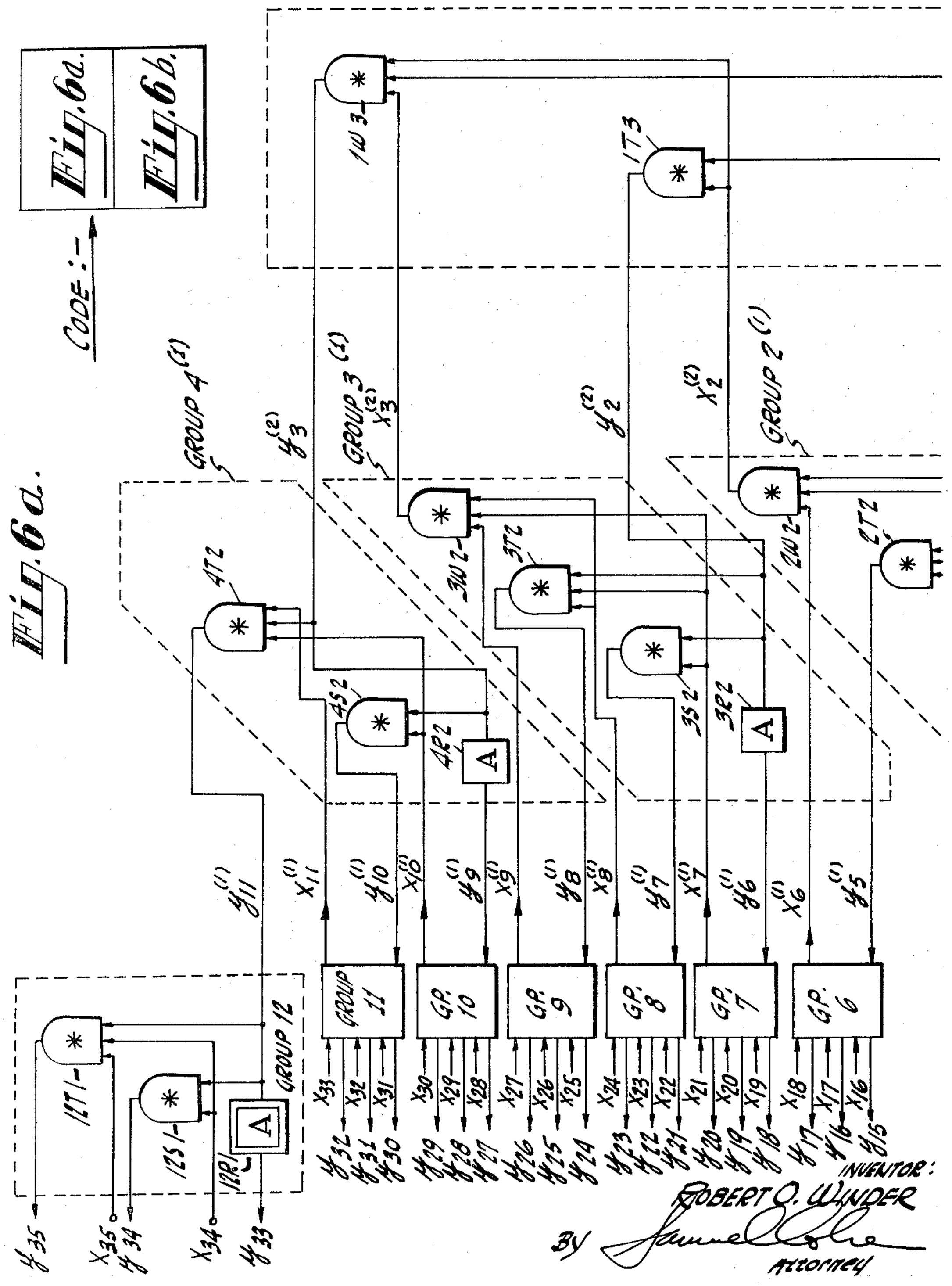
Figure 6B:
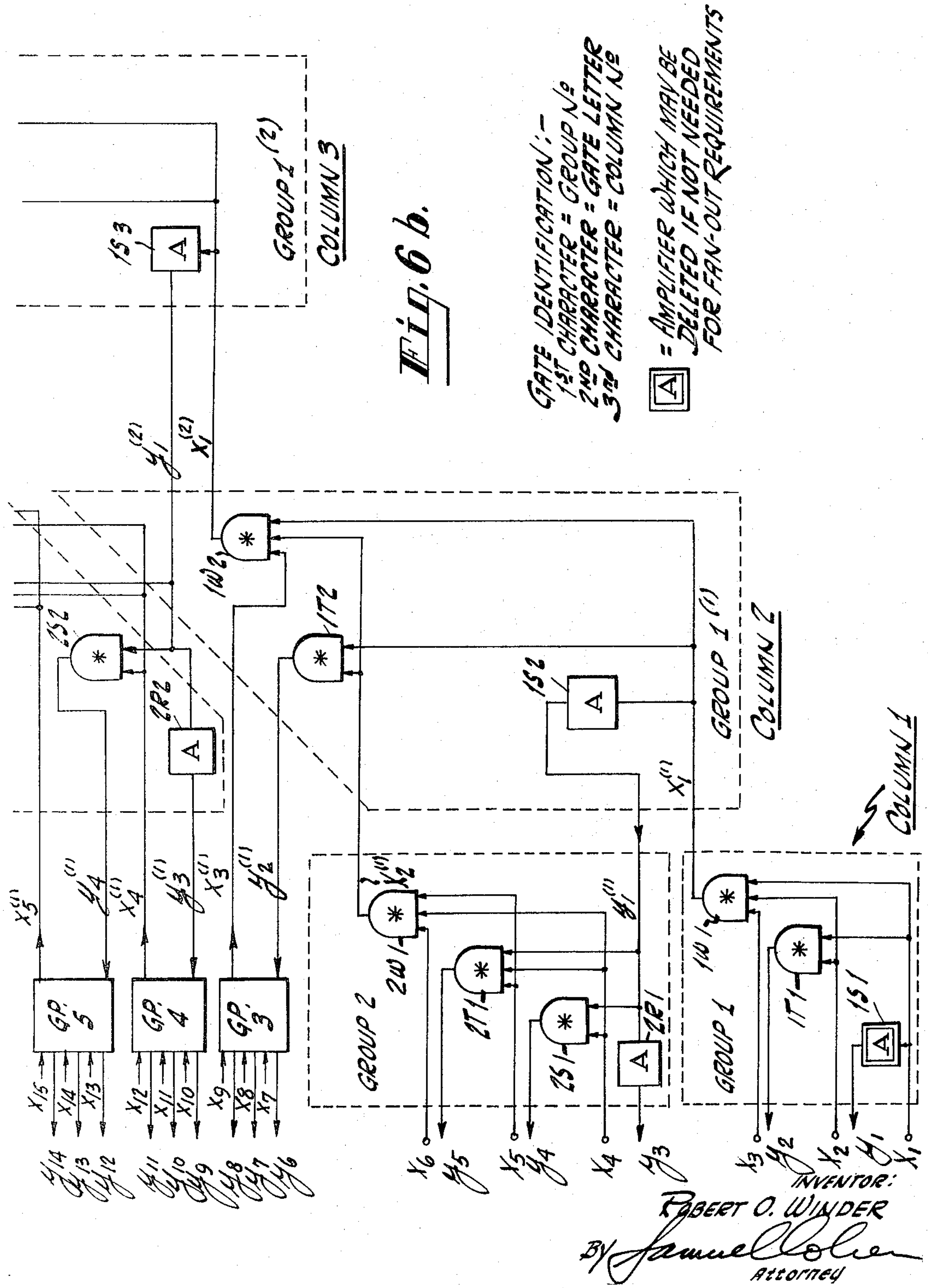
Figure 7A:
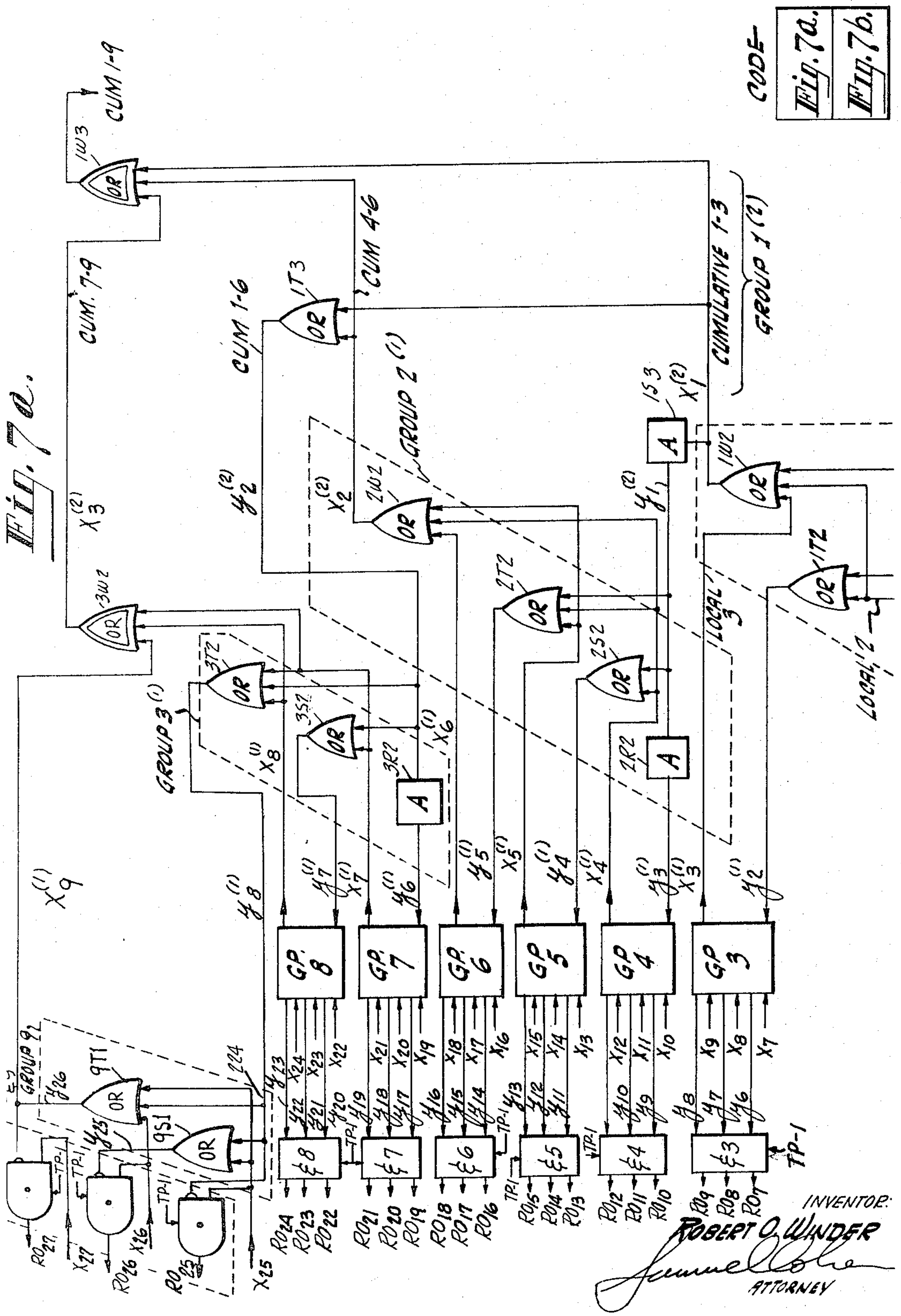
Figure 7B:
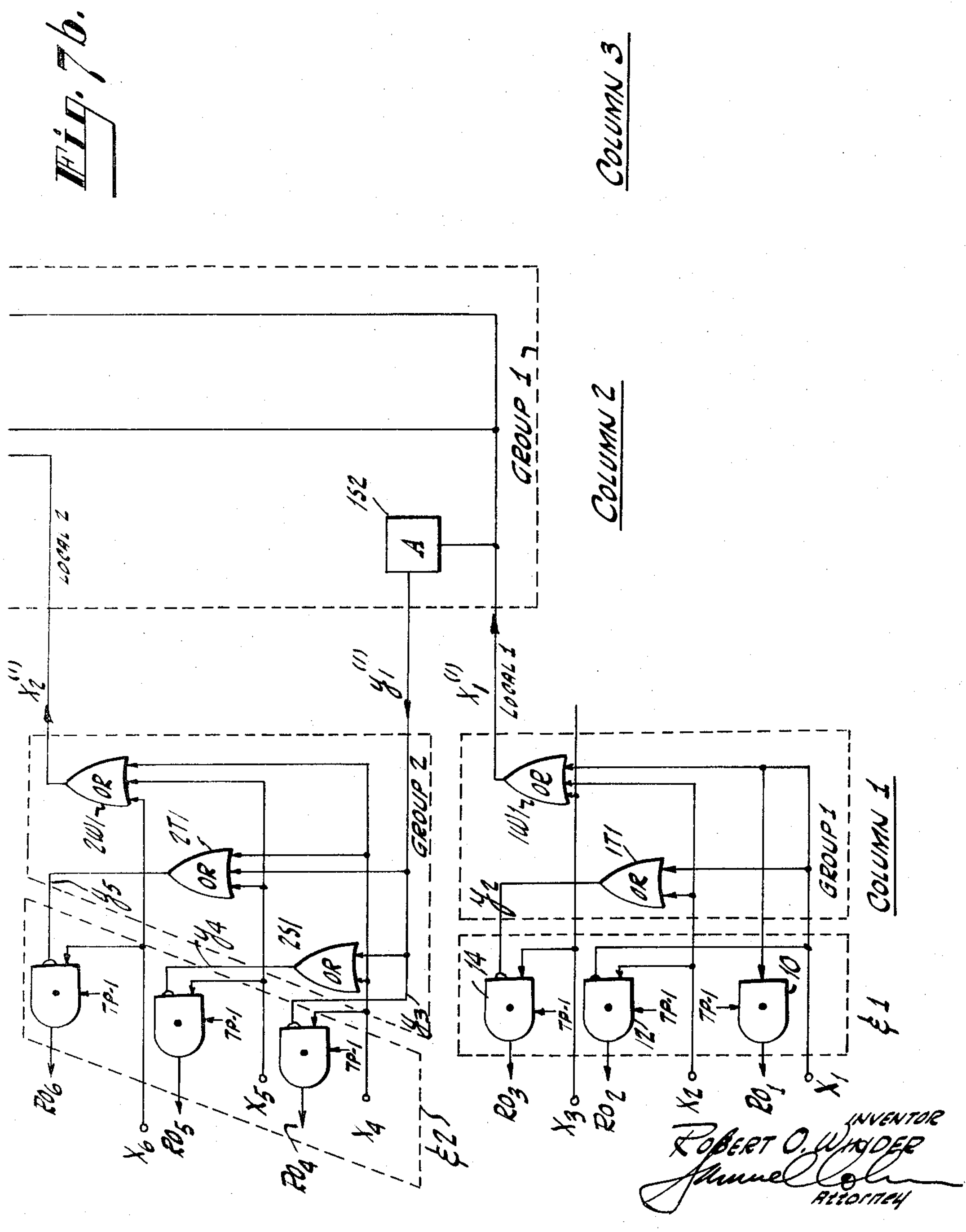
Figure 8:
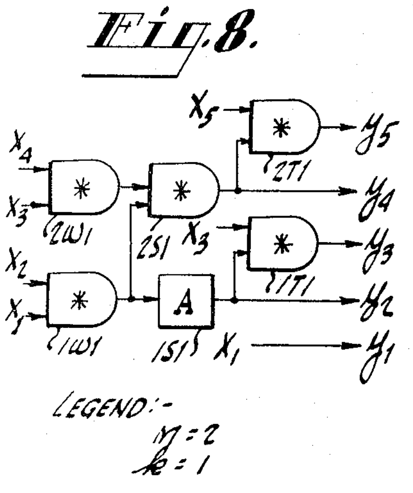
Figure 9:
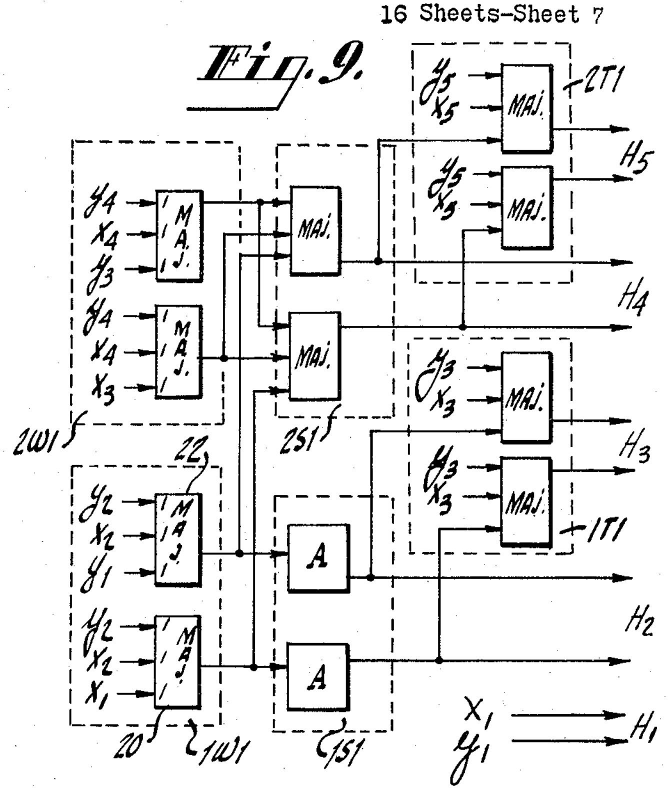
Figure 10:
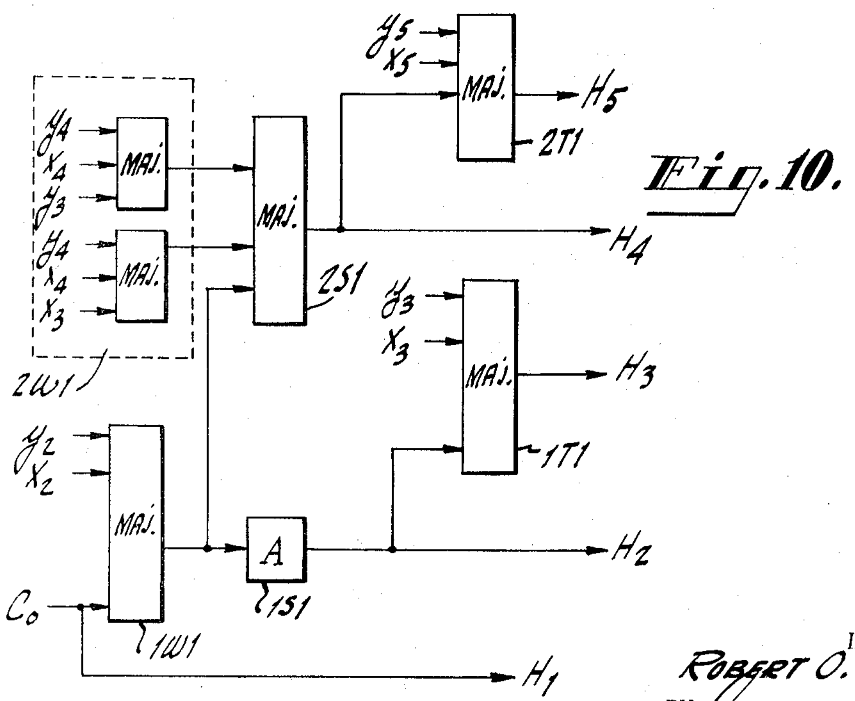
Figure 11A:
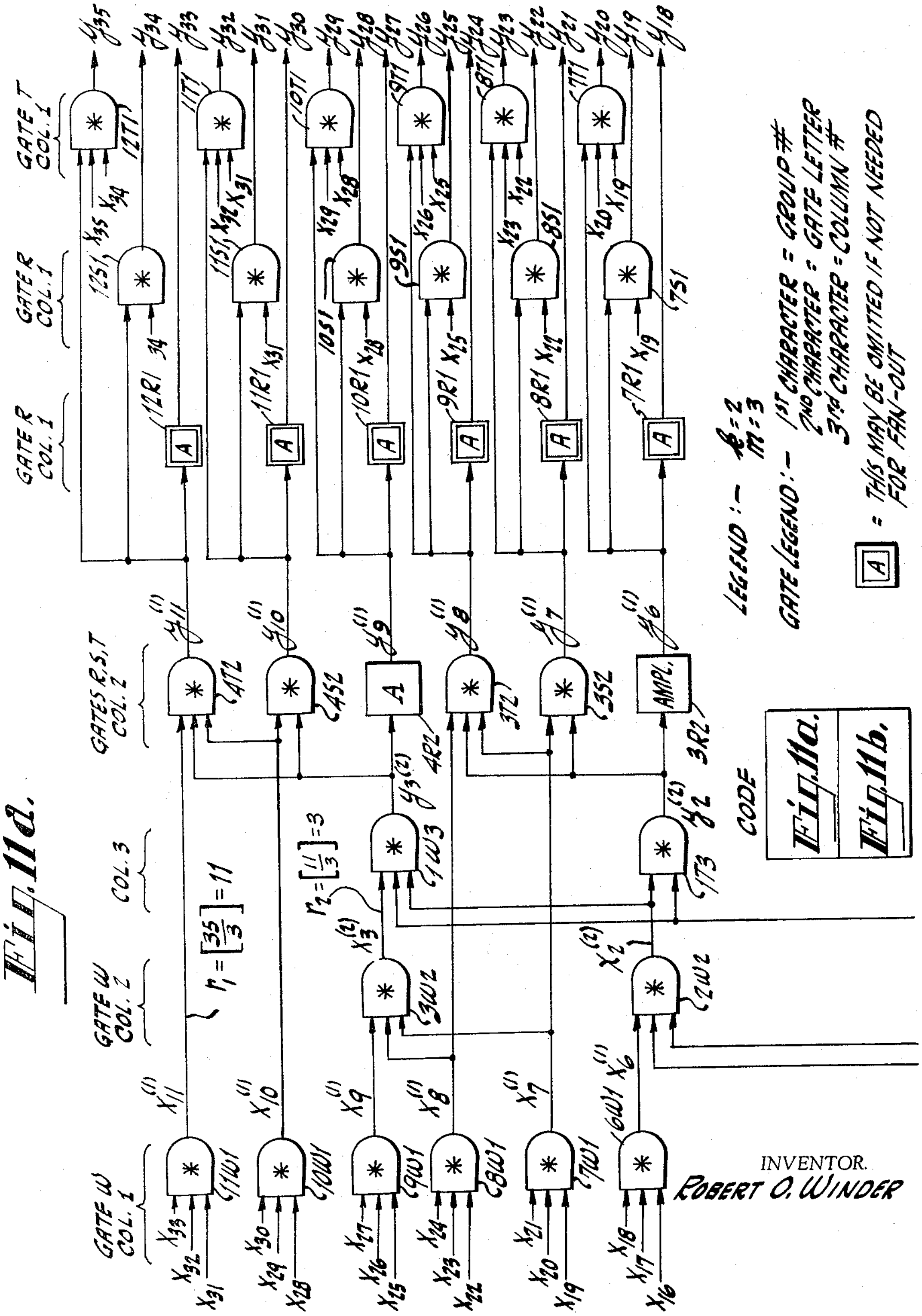
Figure 11B:
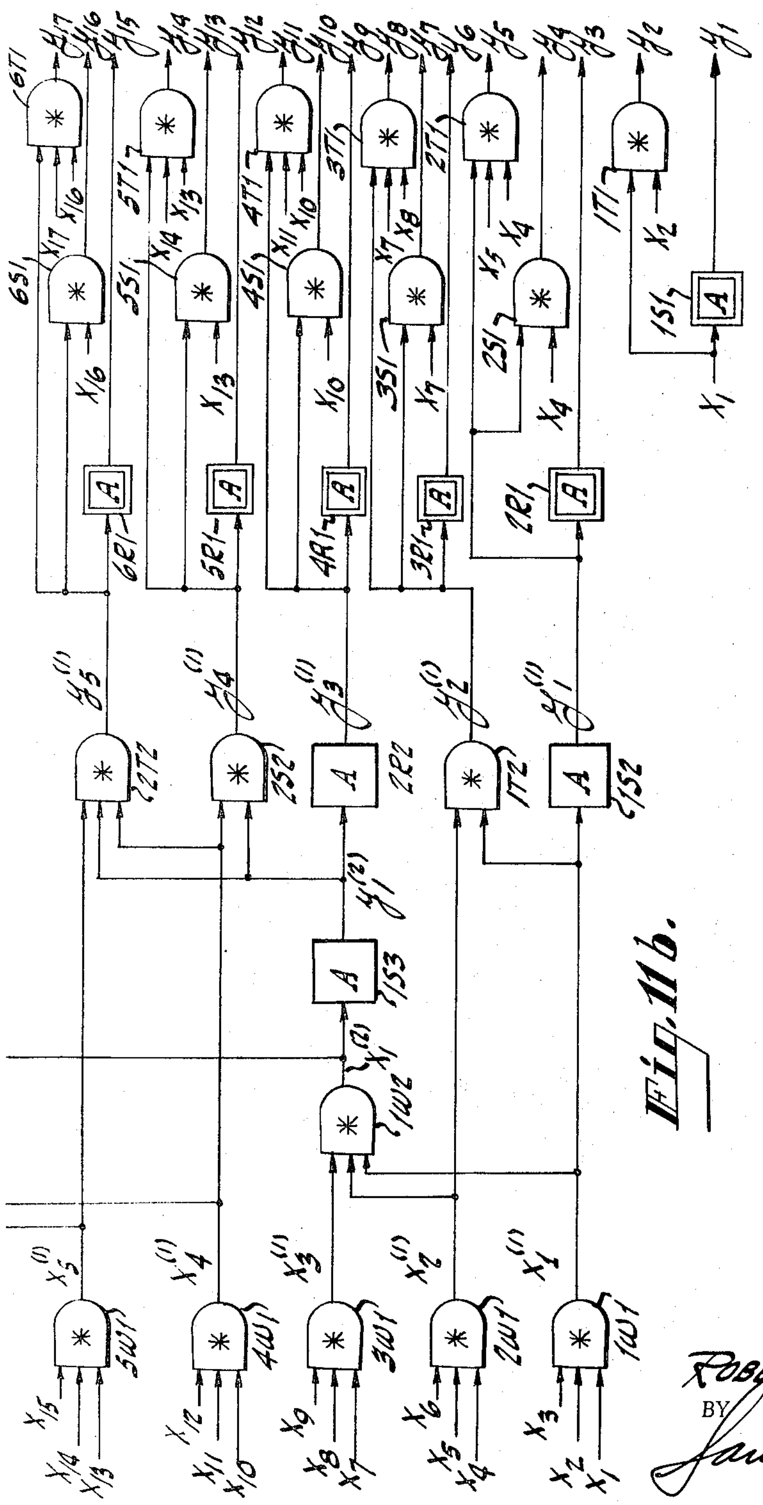

FIG. 6 (on two sheets legended FIGS. 6*a* and 6*b*, respectively) is a more detailed diagram of the system of FIG. 4;

FIG. 7 (on two sheets legended FIGS. 7*a* and 7*b*, respectively) is a block circuit diagram of a selection circuit which includes OR gates arranged according to the teachings of the present invention;

FIGS. 8, 9 and 10 are logic diagrams which show the relationship between majority gates arranged according to the present invention and the more general associative gates arranged according to the invention;

FIG. 11 (on two sheets legended FIGS. 11*a* and 11*b*, respectively) is a detailed logic diagram of the system of FIGS. 4 and 6. The networks of FIGS. 4, 6 and 11 are identical, however, the gates in FIG. 11 are rearranged so that the reader may see the relationship between FIG. 11 and the carry generator of FIG. 12.

Figure 12A:
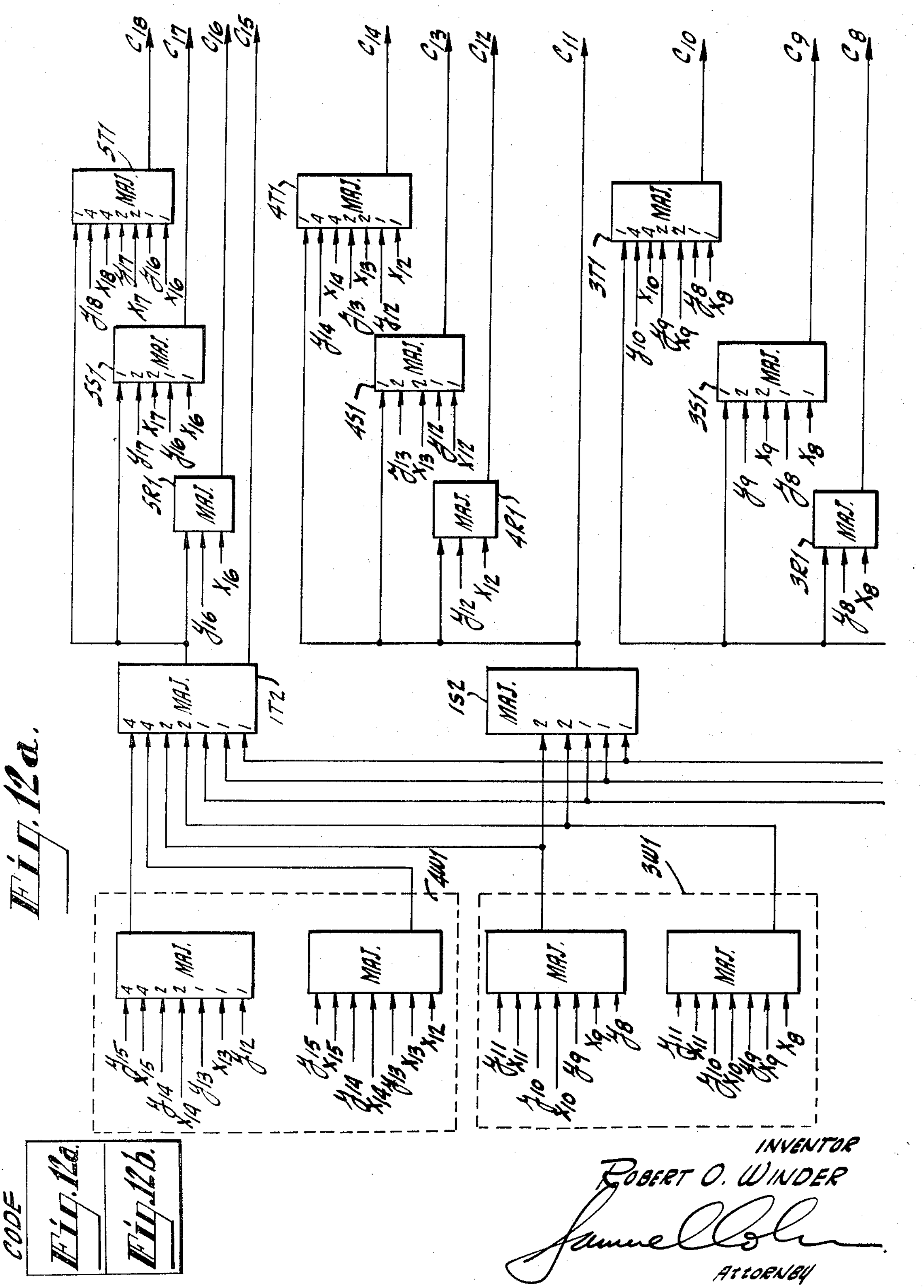
Figure 12B:
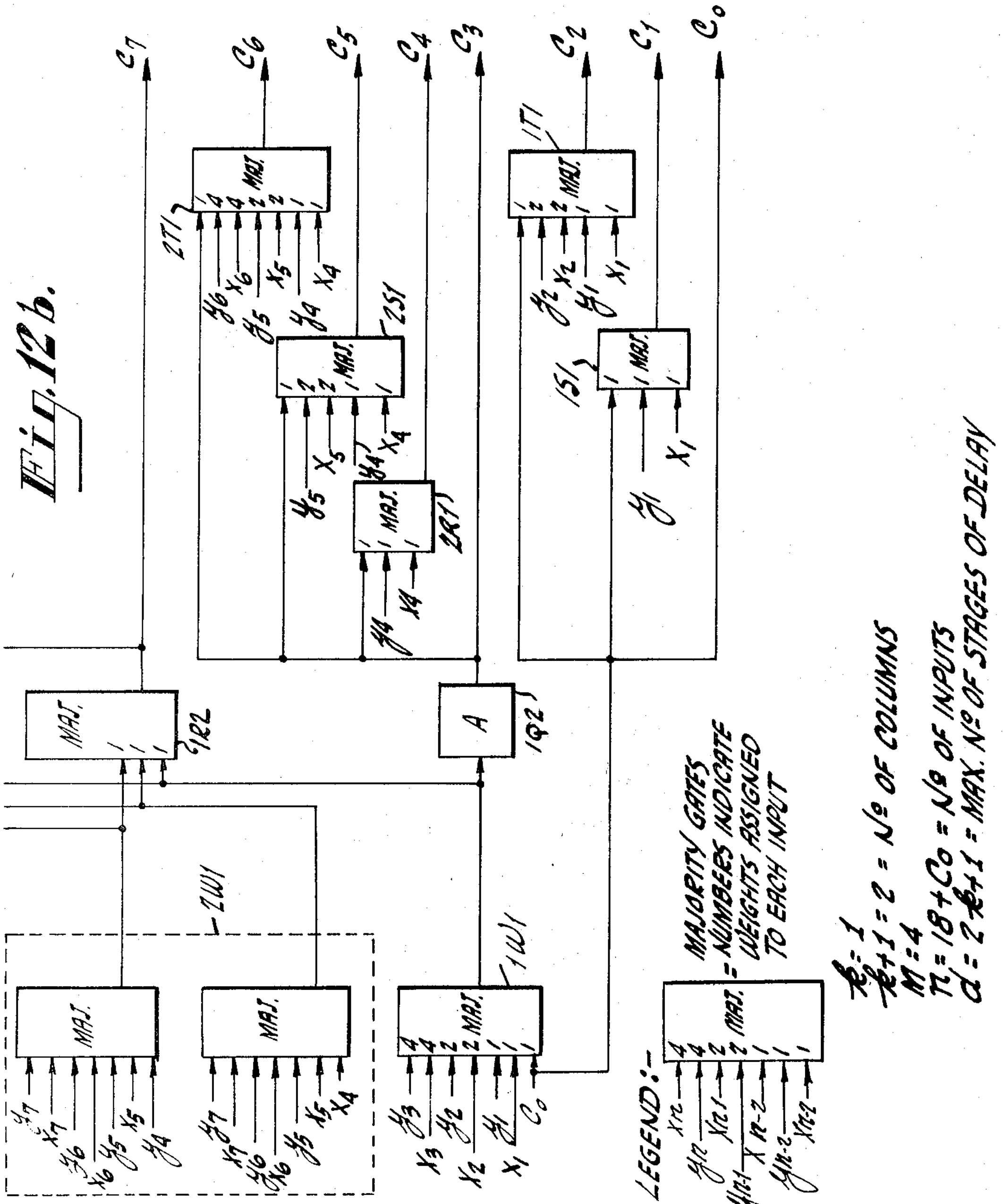
Figure 13A:
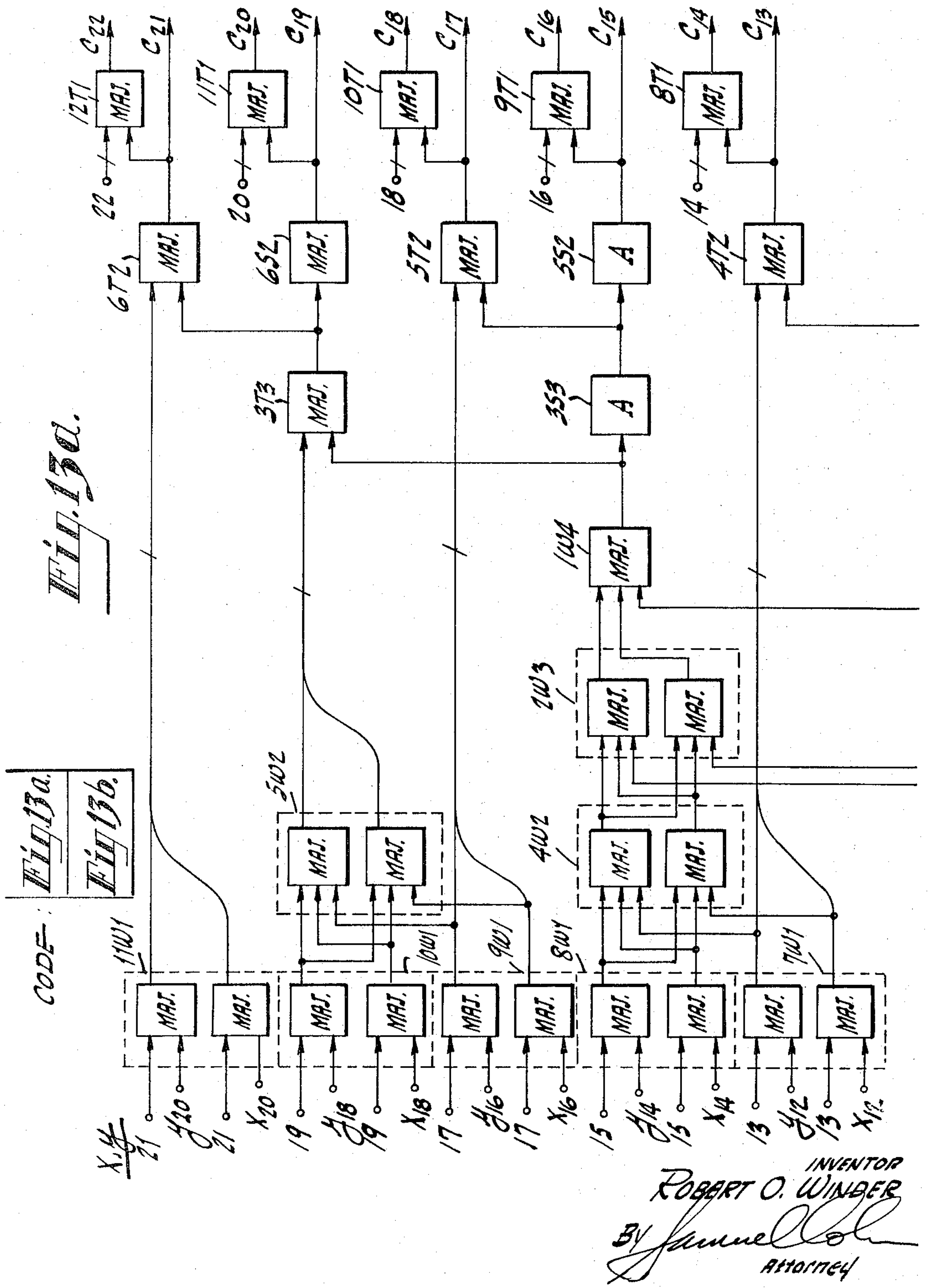
Figure 13B:
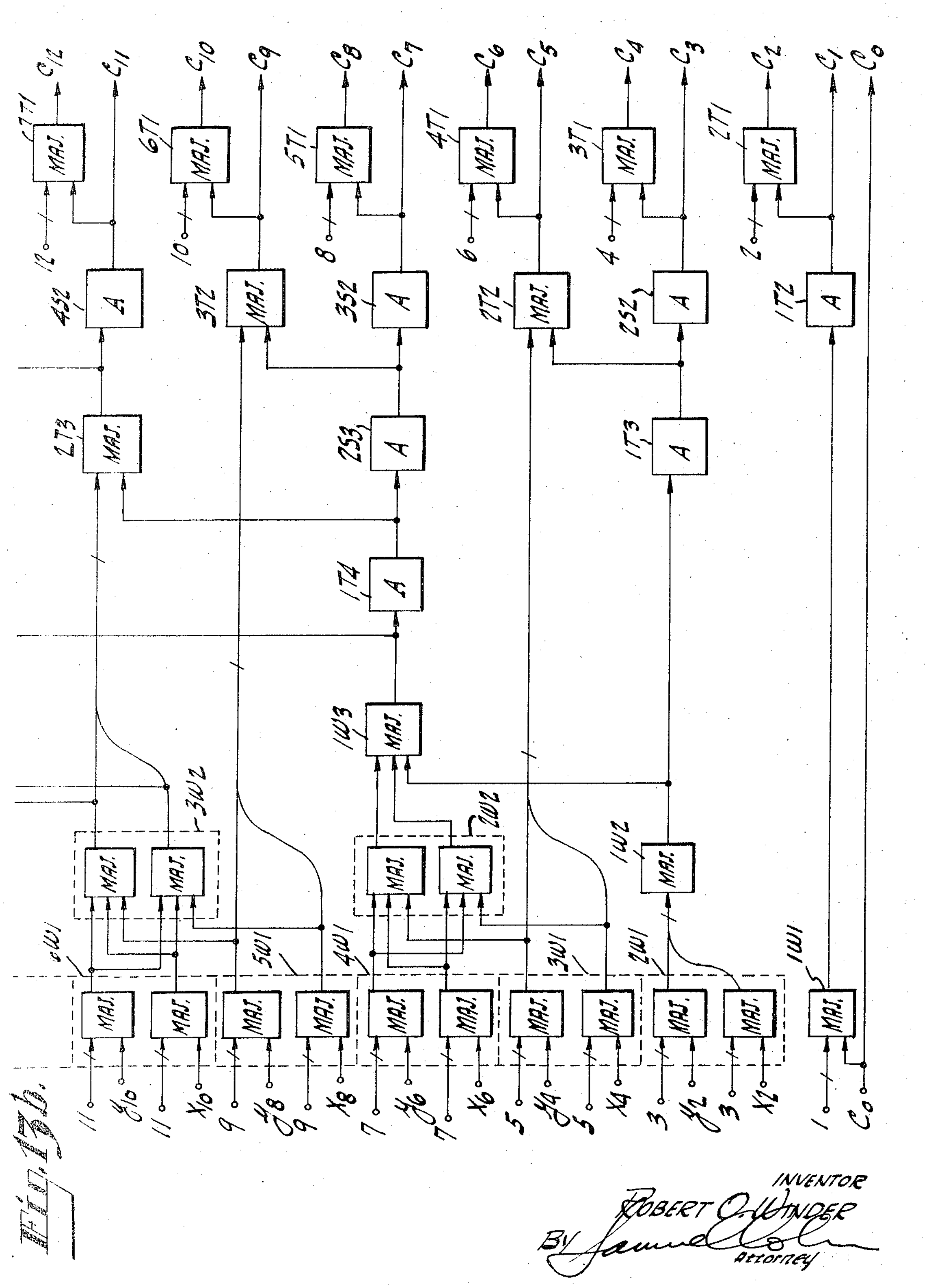
Figure 14:
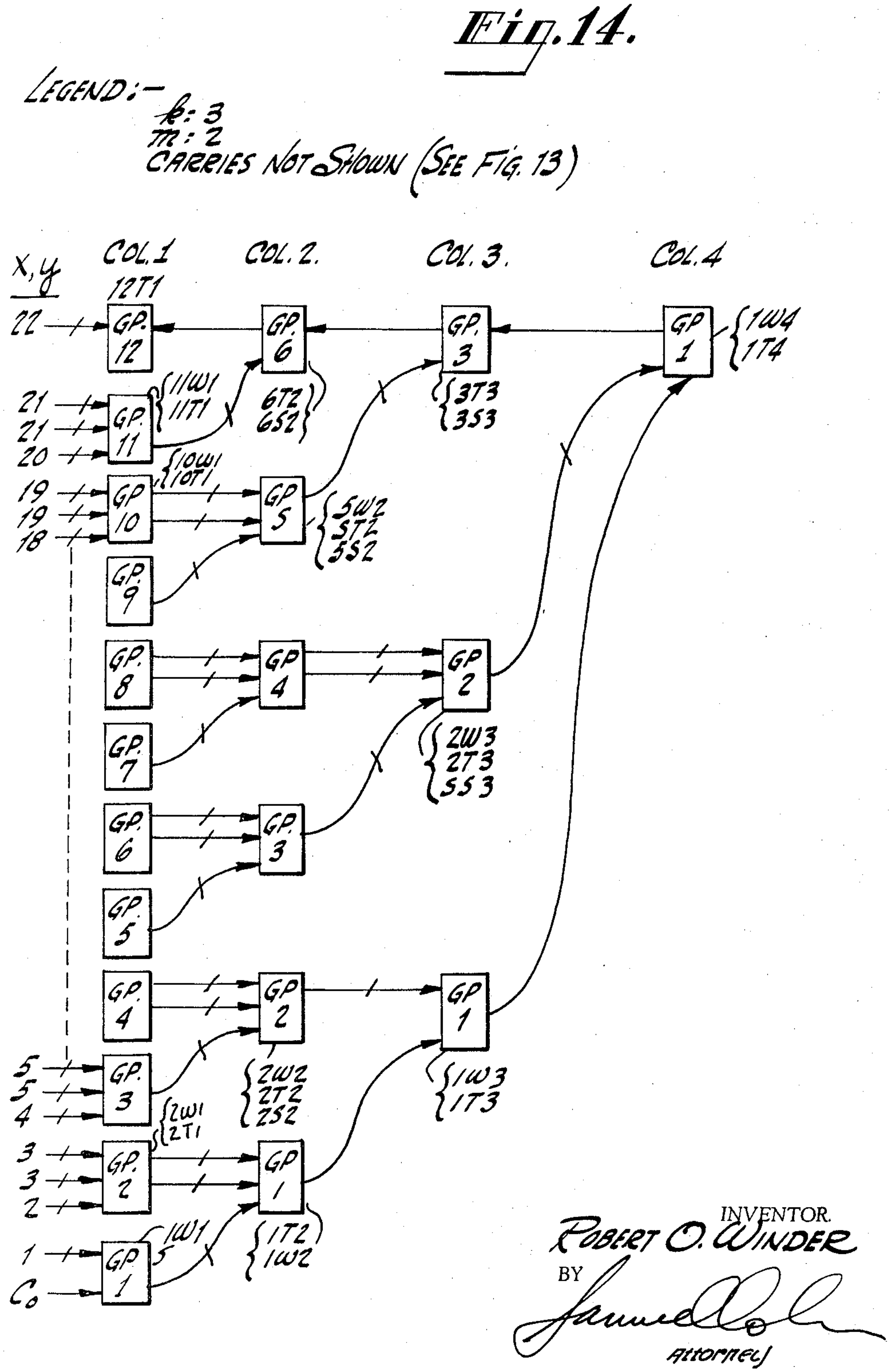
Figure 15:
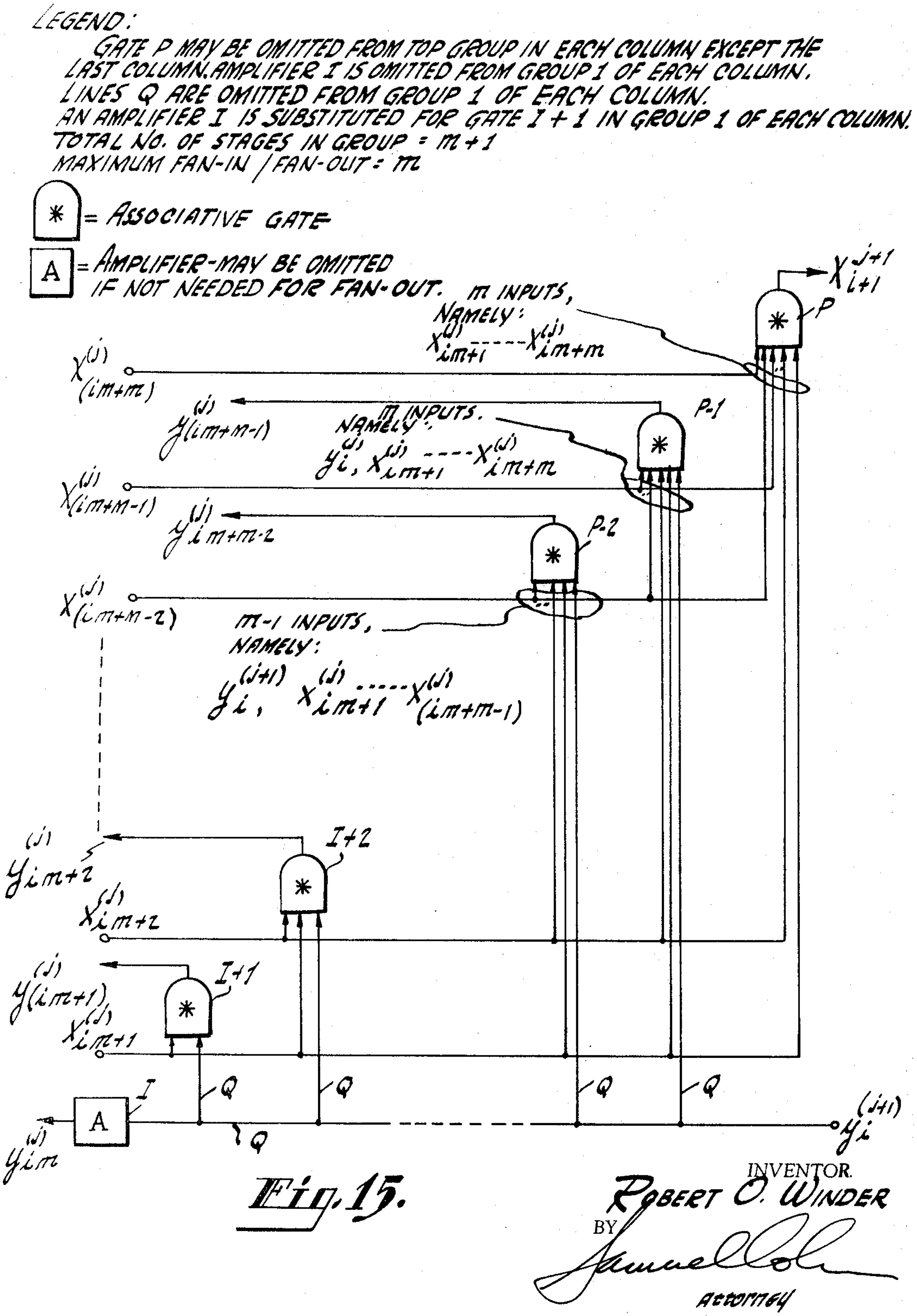
Figure 16:
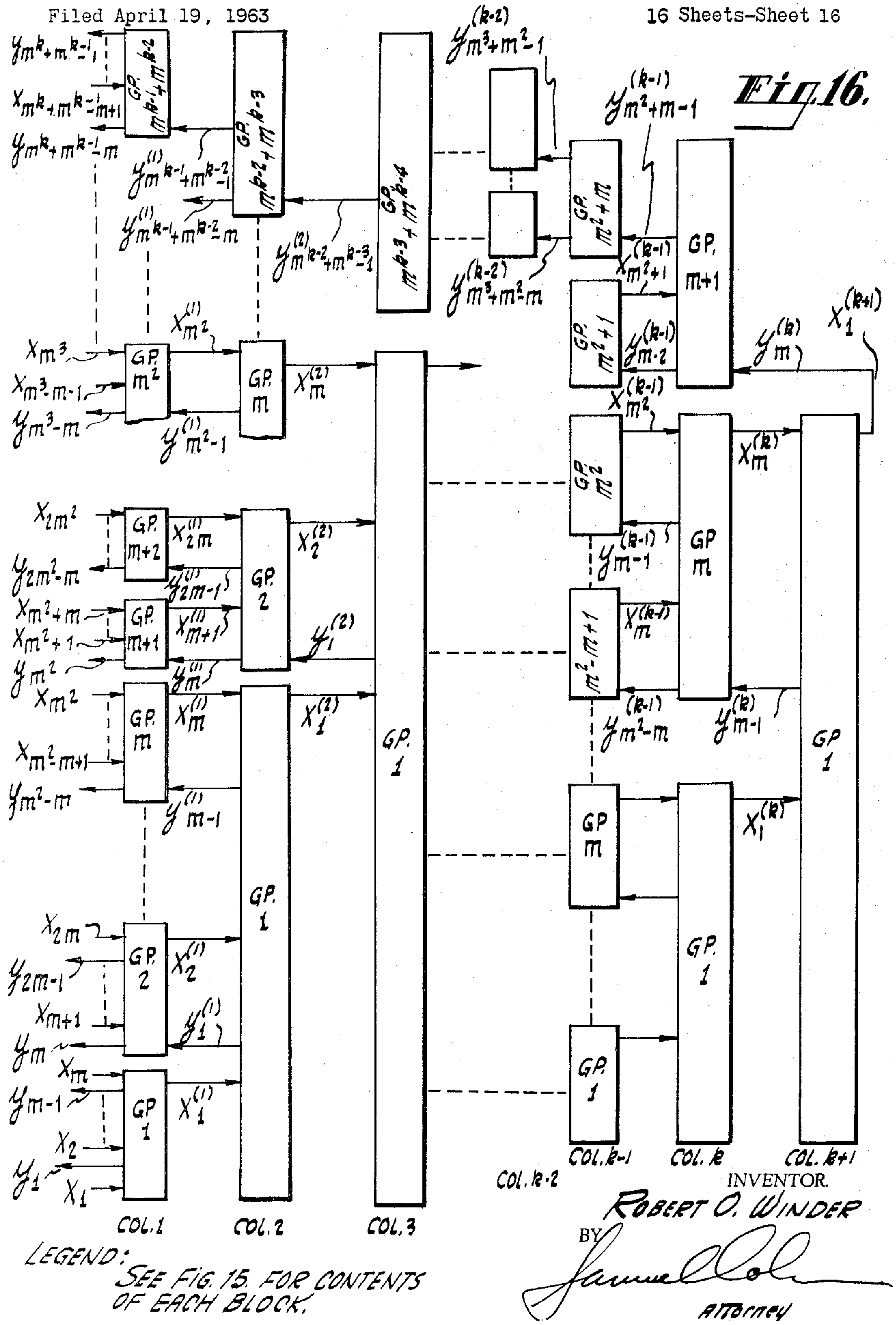

FIG. 12 (on two sheets legended FIGS. 12*a* and 12*b*, respectively) is a logic circuit diagram of a majority gate carry generator according to the present invention;

FIG. 13 (on two sheets legended FIGS. 13*a* and 13*b*, respectively) is a logic circuit diagram of another majority gate carry generator according to the present invention;

FIG. 14 is a block circuit diagram of the same generator as shown in FIG. 13 to illustrate the positions of the gates within the various groups;

FIG. 15 is a generalized logic circuit diagram of a group of stages arranged according to the invention in which the fan-in and fan-out number is $m$, where $m$ may be any desired value; and FIG. 16 is a generalized showing of a network of associative gates for solving Equations 2–5 which appear below, where $m$, the fan-out number and $n$ the number of inputs and outputs are any arbitrary values desired.

The problem dealt with in the present invention is that of realizing a set of given associative functions. Throughout the discussion which follows, * is the symbol employed to represent an associative operation. In mathematical terms, associativity may be defined by the following equation:

$$a*(b*c)=(a*b)*c \qquad (1)$$

Put into words, the equation above says that the manner of grouping the arguments is immaterial, that is, it does not affect the result which is obtained.

The concept above is illustrated in FIG. 1. The gates shown there are AND gates as they fall within the class of associative gates. In the left figure the two inputs (arguments) $b$ and $c$ are applied to the top gate 9 and the two inputs $a$ and $bc$ are applied to the bottom gate 11. In the right figure, the top gate **9*a* receives the inputs $a$ and $b$ whereas the bottom gate 11*a*** receives inputs $ab$ and $c$. The outputs $d$ produced by the two networks are the same even though the inputs have been grouped differently.

Some examples, other than AND functions, of associative functions are OR, exclusive OR, equivalence, multiplication of matrices, and so on.

The specific problem dealt with in the present application is that of realizing the following associative functions:

$$y_1=x_1 \qquad (2)$$
$$y_2=x_1*x_2 \qquad (3)$$
$$y_3=x_1*x_2*x_3 \qquad (4)$$
$$\vdots$$
$$y_n=x_1*x_2*x_3* \ . \ . \ . \ *x_n \qquad (5)$$

Put into words, Equation 3 says that $y_2$ is an associative function of $x_1$ and $x_2$, where $x_1$ and $x_2$ are input variables. If the specific type of function were OR, Equation 3 would be $y_2=x_1+x_2$. Equation 5 says that $y_n$ is an associative function of $x_1$ through $x_n$.

If practical, physically realizible gates were available which could accept $n$ inputs, any one of the functions of Equations 2–5 easily could be realized by a single gate such as shown in FIG. 2. (In FIG. 2 and in the remaining figures an associative gate is represented by an asterisk within a rounded-off rectangle.) In practice, however, the fan-in to any gate is limited. Therefore, it is standard procedure, in the case in which the fan-in is excessive, to substitute for a single gate a tree network of such gates. As an example, in the case in which only three input associative gates are available and there are nine inputs $x_1$–$x_9$ which must be handled, a network of the type such as in FIG. 3 may be employed. This network includes four gates. Each of the top three gates receive 3 inputs and the fourth gate receives inputs from the top three gates.

In more general terms, $m^j$ inputs are handled in $j$ levels, using $$m^{j-1}+m^{j-2}+\ldots+1=\frac{m^j-1}{m-1}$$

associative gates . When $n$ is not a power of $m$, the formula still holds; since each gate in effect replaces $m$ input leads by one output lead, and since $n$ original input leads have to be reduced to one final output lead, the number of gates needed is just $(n-1)$ divided by $(m-1)$. It can be shown that the number of gates G which would be required by use of trees to realize all of the $y$'s of Equations 2–5 would be approximately $$G=\frac{n-1}{m-1}\left(\frac{n+m-2}{2}\right) \qquad (5a)$$

Here, $n$ refers to the number of arguments (the number of inputs) and $m$ refers to the maximum fan-in and fan-out number which is permissible.

From the Equation 5a above, it becomes quite clear that the solution illusrated in FIG. 3 uses a large number of gates. One can try combining separate networks in different ways in order to reduce the number of gates. However, in one method of combinintg, it turns out that the fan-out requirements of the gates are increased enormously. The fan-out problem can be somewhat alleviated by adding trees of amplifiers at the outputs of the gates. However, this adds more elements as well as additional stages of delay.

To sum up what has been discussed briefly above, the various solutions proposed heretofore for solving the problem set forth in Equations 2–5, in which $n$ may be a relatively large number, are not practical for one or more of the following reasons:

(1) The fan-in becomes too large.
(2) The number of gates becomes too great.
(3) The number of stages of delay becomes too great.
(4) The fan-out becomes too large.

In the system of the invention which is discussed in detail below, the fan-in and fan-out number $m$ is a reasonably small value. The approximate total number G of gates required to produce all of the $y$'s of pages 4 and 5 is given by the equation:

$$G=\frac{(m^2+1)}{m(m-1)}n-\frac{m+1}{m-1}-\log_m n+1 \qquad (6)$$

The maximum number of stages of delay between the time an input signal $x$ is applied and an output signal $y$ is produced is $$2[\log_m n]-1 \qquad (6a)$$

where [] refers to the smallest integer greater than or equal to the term within this bracket. Finally, the network has a uniform and regular design which is readily realized in practice.

The network itself is shown in FIGS. 4, 5 and 6. The showing is generalized in the sense that the gates are associative gates. However, for the sake of illustration, a specific $m$ and $n$ have been chosen ($m=3$, $n=35$), where again $m$ equals the maximum fan-in and fan-out number and $n$ equals the number of inputs (arguments).

In the discussion of the invention which follows, first a brief description is given of FIGS. 4, 5 and 6 and then an analysis, in mathematical terms, is given of the interrelationship among the various elements in the figures. Thereafter, to illustrate the usefulness of the networks in these figures, a number of examples of networks employing more specific logic gates are given. In one, the associative gates are OR gates and the network is a "selection network." (A definition of a "selection network" is given later.) In other examples, the gates employed are majority gates and the networks are carry generators (networks used in adders). It is to be understood that these examples are not meant to be exhaustive of the uses of the associative gate networks of the invention.

In the three FIGURES 4, 5 and 6, the inputs to the network are legended $x$ followed by a subscript. There are a total of 35 inputs ($n=35$), legended $x_1$–$x_{35}$. The outputs are legended $y$ and there are also 35 of these legended $y_1$–$y_{35}$. The superscripts applied to certain of the letters are for purpose of identification and do not indicate that any input is raised to a power. For example, $x_3^{(1)}$ refers to a signal which is applied by group 3 (group refers to a number of stages such as shown in FIG. 5) in column 1 to group 1 in column 2. Equations given below further identify these signals and others.

The gates within each group are shown generally in FIG. 5. As a general proposiiton, the number of stages (gates plus amplifiers) in a group is equal to $m+1$. In the present case, since $m=3$ there are four stages in a group. Of these stages three are associative gates and the fourth (the bottom stage) is an amplifier. The amplifier performs the identity logic function. Put another way, the purpose of the amplifier is to satisfy fan-out requirements.

From the rules given in FIG. 5, it should be clear that the groups 2–11 in column 1 of FIG. 4 each contain the same number of gates. Group 1 in each column omits the bottom stage (amplifier R in FIG. 5) and the lines Q. In addition, in group 1 in each column, gate S is converted to an amplifier. (As a general rule, any stage which has only one input becomes an amplifier regardless of the group the stage is in.)

The second rule appearing in FIG. 5 is that the topmost gate W is removed from the topmost block in each column of FIG. 4 except in the last column. Further, any amplifier in column 1 of FIG. 4 may be eliminated if not needed for purposes of fan-out. An example of this is given later in connection with the selection circuit of FIG. 7.

In the generalized showing of FIG. 5, letter subscripts and superscripts are applied to the inputs and outputs $x$ and $y$, respectively. For example, gate S receives an input $x_{im+1}^{(j)}$. To illustrate, in the case of $x_1$ then $i=0$ and $j=0$. This causes $x_{im+1}^{(j)}$ to reduce to $x_1$, since when $j$ is a 0 the superscript may be omitted entirely. As another example, one of the leads going to gate T is legended $x_{im+2}^{(j)}$. In the case in which $i=1$ and $m=3$ and $j=0$, this $x$ reduces to $x_5$. In FIG. 6 it can be seen that $x_5$ is an input to gate 2T1.

The term $k$ which is used in some of the following equations is a constant whose value depends upon $m$ and $n$. The equations are max $n=m^{k+1}+m^{k-1}$ so that $$(6b)$$

$$k=\left[\log_m\left(\frac{n+1}{m+1}\right)\right] \qquad (6c)$$

The number of columns in a network is equal to $k+1$. Accordingly, it can be seen that in the circuit of FIGS. 4, 5 and 6, $k$ is equal to 2.

The network of FIGS. 4, 5 and 6 can be seen by inspection to satisfy the Equations 2 and 3 previously given. It is clear from FIG. 6 that $y_1=x_1$. Further, the output $y_2$ produced by the associative gate 1T1 is $x_1*x_2$. In the equations which follow, it will be shown that Equations 4 and 5 are also satisfied. In relating these equations to the system, it will be helpful for the reader to refer mainly to FIG. 6.

$$x_1^{(1)}=x_1*x_2*\ldots*x_m=x_1*x_2*x_3 \text{ (for } m=3) \qquad (7)$$

$$x_2^{(1)}=x_{m+1}*x_{m+2}*\ldots*x_{2m} \qquad (8)$$

.
.
.

$$x_{i+1}^{(1)}=x_{im+}*\ldots*x_{im+m} \qquad (9)$$

.
.
.

$$x_{r_1}^{(1)}=x_{r_1m+1-m}*\ldots*x_{r_1m} \qquad (9a)$$

where $$r_1=\left[\frac{n}{m}\right]$$

The brackets in Equation 9a mean that $r_1$ is an integer, any fraction remaining where $n$ is divided by $m$ being dropped. In the present example, $$r_1=\left[\frac{35}{3}\right]=11$$

To continue:

$$x_1^{(j+1)}=x_1^{(j)}*x_2^{(j)}*\ldots*x_m^{(j)} \quad (10)$$

.
.
.

$$x_{i+1}^{(j+1)}=x_{im+1}^{(j)}*\ldots*x_{im+m}^{(j)} \quad (11)$$

.
.
.

$$x_{r_{j+1}}^{(j+1)}=x_{r_{j+1}m+1-m}^{(j)}*\ldots*x_{r_{j+1}m}^{(j)} \quad (12)$$

where $$r_{j+1}=\left[\frac{r_j}{m}\right]$$

The procedure above may be continued for $j=1, 2 \ldots$ until, for some value of $j$, $r_j$ is equal to or less than $m$. Suppose the first such $j$ is $k$, as previously defined. (Note that $1<r_k\leq m$). Then it is not necessary to define any $x_i^{(k+1)}$.

Continuing:

$$x_1^{(k)}=x_1^{(k-1)}*x_2^{(k-1)}*\ldots x_m^{(k-1)} \quad (13)$$

$$x_2^{(k)}=x_{m+1}^{(k-1)}*x_{m+2}^{(k-1)}*\ldots*x_{2m}^{(k-1)} \quad (14)$$

.
.

$$x_i^{(k)}=x_{mi+1}^{(k-1)}*\ldots*x_{mi+m}^{(k-1)} \quad (15)$$

.
.

$$x_{r_k}^{(k)}=x_{mr_k+1}^{(k-1)}*\ldots*x_{mr_k+m}^{(k-1)} \quad (16)$$

where $1<r_k\leq m$. Now, with the values of $x_i^{(k)}$ defined above, and working in the reverse direction:

$$y_1^{(k)}=x_1^{(k)} \quad (17)$$

$$y_2^{(k)}=x_1^{(k)}*x_2^{(k)} \quad (18)$$

.
.

$$y_i^{(k)}=x_1^{(k)}*\ldots*x_i^{(k)} \quad (19)$$

.
.
.

$$y_m^{(k)}=x_1^{(k)}*\ldots*x_m^{(k)} \quad (20)$$

(Except that some of the $y_i^{(k)}$ may not be needed, in which case they may be dropped).

$$y_1^{(k-1)}=x_1^{(k-1)} \quad (21)$$

$$y_2^{(k-1)}=x_1^{(k-1)}*x_2^{(k-1)} \quad (22)$$

.
.

$$y_{m-1}^{(k-1)}=x_1^{(k-1)}*\ldots*x_{m-1}^{(k-1)} \quad (23)$$

$$y_m^{(k-1)}=y_1^{(k)} \quad (24)$$

$$y_{m+1}^{(k-1)}=y_1^{(k)}*x_{m+1}^{(k-1)} \quad (25)$$

.
.
.

$$y_{2m-1}^{(k-1)}=y_1^{(k)}*x_{m+1}^{(k-1)}*\ldots*x_{2m-1}^{(k-1)} \quad (26)$$

$$y_{mi}^{(k-1)}=y_i^{(k)} \quad (27)$$

$$y_{mi+1}^{(k-1)}=y_i^{(k)}*x_{mi+1}^{(k-1)} \quad (28)$$

$$y_{mi+2}^{(k-1)}=y_i^{(k)}*x_{mi+1}^{(k-1)}*x_{mi+2}^{(k-1)} \quad (29)$$

.
.
.

$$y_{mi+m-1}^{(k-1)}=y_i^{(k)}*x_{mi+1}^{(k-1)}*\ldots*x_{mi+m-1}^{(k-1)} \quad (30)$$

Where, again, $y_i^{(k-1)}$ are defined as far as they are needed below. In general the $y_i^{(j)}$ are defined analogously.

$$y_1^{(j)}=x_1^{(j)} \quad (31)$$

$$y_2^{(j)}=x_1^{(j)}*x_2^{(j)} \quad (32)$$

$$y_{m-1}^{(j)}=x_1^{(j)}*\ldots*x_{m-1}^{(j)} \quad (33)$$

and then as many $y$'s as are needed of the form:

$$y_{qm+r}^{(j)}=y_q^{(j+1)}*x_{qm+1}^{(j)}*x_{qm+2}^{(j)}*\ldots*x_{qm+r}^{(j)} \quad (34)$$

(Where $q\geq 1$ and $0\leq r<m$). The $y_i^{(0)}$ are the desired outputs, as follows: (Recall that the $x_i^{(1)}$. A special first block:

$$y_1=x_1 \quad (35)$$

$$y_2=x_1*x_2 \quad (36)$$

$$y_{m-1}=x_1*\ldots*x_{m-1} \quad (37)$$

and then $y_i$ of the form:

$$y_{qm+r}=y_q^{(1)}*x_{qm+1}*\ldots*x_{qm+r} \quad (38)$$

(Proof: Note that each $x_i^{(1)}$ is defined as the result of the * operation over a span of $m^j$ of the original input $x$'s:

$$x_{i+1}^{(j)}=x_{im^j+1}*x_{im^j+2}*\ldots*x_{im^j+m^j} \quad (39)$$

Therefore each $y_i^{(j)}$ is defined as the result of the * operation over all of the original input $x$'s up to $x_{im^j}$:

$$y_i^{(j)}=x_1*x_2*\ldots*x_{im^j} \quad (40)$$

Thus the $y_i^{(0)}$ are indeed the desired outputs.

To summarize the above, it has been shown formally that the network of the form illustrated in FIGS. 4, 5 and 6 does in fact satisfy the requirements set forth in Equations 2–5. Any $y$ one wishes to choose is an associative function of the $x$ of equal rank and all $x$'s of lower rank. For example, if one chooses $y_{18}$, the equation above says that it is an associative function of $x_1$–$x_{18}$ or, in equation form:

$$y_{18}=x_1*x_2*x_3\ldots*x_{18}$$

The amplifiers A in FIG. 6 are to provide fan-out to the left in the network. For example, an amplifier such as 1S2 (Column 2, group $1^{(1)}$) has a fan-out of 3, that is, one output for gate 2T1, a second output for gate 2S1 and a third output for amplifier 2R1. It is needed because $x_1^{(1)}$ must be applied to more than 3 stages. If $y_3$ (which is logically equal to $y_1^{(1)}$ has to be applied to only one stage, then amplifier 2R1 may be eliminated. On the other hand, if $y_3$ must be applied to two or three stages, then the amplifier 2R1 must be included. It might also be mentioned that both in FIG. 6 and in the remaining figures, any amplifier can be omitted if the gate preceding the amplifier is made to have a fan-out which is sufficiently larger than $m$. For example, gate 1W1 of FIG. 6 is assumed to have a fan-out of 3 but it must supply outputs to 4 logic stages and it must also provide the signal $y_3$. Therefore, if gate 1W1 is instead designed to have a fan-out of 4, amplifier 1S2 may be eliminated. And, if gate 1W1 is instead designed to have a fan-out of 5, amplifiers 1S2 and 2R1 may be eliminated, provided $y_3$ is needed for only one stage.

From the discussion above, it is seen that the number of gates in the circuit is reasonably small considering the number of inputs. FIG. 6 shows that the maximum delay between an input signal and an output signal derived therefrom is that imparted by 5 stages, also a reasonable value. For example, in obtaining $y_{28}$, the delays will include those inserted by a gate in column 1, a gate in column 2, a gate in column 3, a second gate in column 2 and a second gate in column 1. Increasing the number of inputs increases the number of delays. However, the increase in the number of gates is at a relatively low rate as indicated by Equation 6 and the increase in the number of stages of delays is logarithmic with respect to $n$ (see Equation 6$a$).

One practical use of the system of the present invention is illustrated in FIG. 7. This circuit is a selector circuit and is implemented with a matrix of OR gates arranged in the manner discussed in detail above. The $y$ outputs are applied to inhibit terminals of AND gates.

In the circuit of FIG. 7, the inputs $x_1$–$x_{27}$ may be signals appearing on lines. A signal at one level represents the binary bit 1 and a signal at a second level represents the binary bit 0. The signals present on the line are employed in a computer controlled automatic communications system to indicate precedence of messages which are to be processed, and accumulated in storage devices such as registers (not shown). For example, the line carrying the signal $x_1$ represents the storage in the $x_1$ register (not shown) of a message of highest precedence. The presence of a signal $x_2=1$ on the following line represents the storage in the $x_2$ register (not shown) of a message of next lower precedence and so on.

The purpose of the circuit of FIG. 7 is to sense the lines carrying the signals, hereafter termed active lines, in sequence. However, the circuit jumps from one active line to the next active line, skipping any lines that are inactive, in order to save time. When a line is active, the circuit produces a read-out signal RO. This read-out signal is applied to the register (not shown) associated therewith at the time a timing pulse TP–1 occurs. The read-out signal commands the register to be read out and the data to be processed, whereupon the $x$ signal associated with that register changes from 1 back to 0.

In the system of FIG. 7, the maximum fan-out assumed is $m=3$. $n$, the number of inputs assumed, is 27. The amplifiers in column 1 are omitted as they are not needed for fan-out purposes. It will also be shown shortly that the gates 3W2 and 1W3 are not needed for the purpose of generating the last read-out signal $RO_{27}$ and could have been omitted, as the rules given state. However, in this particular network they serve a separate purpose, namely, that of indicating whether or not at least one of the input lines is still active, and these gates are therefore retained.

In the system of FIG. 7, group 1 of column 1 consists of 2 OR gates 1T1 and 1W1. Groups 2 through 8 of column 1 consist of 3 OR gates each, S, T and W. Group 9 of column 1 includes 2 OR gates 9T1 and 9S1. Group $1^{(1)}$ of column 2 includes 2 OR gates 1T2 and 1W2 and an amplifier 1S2; group $2^{(1)}$ of column 2 includes three OR gates 2S2, 2T2 and 2W2, and an amplifier 2R2; group $3^{(1)}$ of column 2 includes two OR gates 3S2 and 3T2, an amplifier 3R2 and an optional OR gate 3W2. The last group, group $1^{(2)}$ in column 3 includes OR gate 1T2, amplifier 1S2, and the optional OR gate 1W3.

The gates which generate the read-out (RO) signals are AND gates. These are ararnged in groups too. Group &1 includes three AND gates 10, 12 and 14, two of which 12 and 14 include inhibit input terminals. All of the remaining groups &2 through &9 include three AND gates, each of which has an inhibit terminal.

In the operation of the system of FIG. 7, assume that lines $x_1$, $x_3$, $x_6$ and $x_{25}$ are active and all remaining lines are inactive. Upon the occurrence of TP–1 (which is a periodically generated timing pulse), AND gate 10 is enabled and the read-out signal $RO_1$ is produced since $x_1=1$. However, each of the remaining AND gates is disabled by a $y=1$ signal applied to its inhibit terminal. For example, AND gate 12 is disabled by the signal $y_1=x_1=1$ applied to its inhibit terminal; AND gate 14 is disabled by the signal $y_2=x_1+x_2=1$. In a similar manner, it can be shown that all remaining AND gates are disabled.

After the occurrence of TP–1 and $RO_1=\mathbf{1}$, the register (not shown) associated with $x_1$ is read out and $x_1$ changes to 0. The next TP–1 pulse now occurs. $x_1=\mathbf{0}$ so that AND gate 10 is disabled. $x_2$ was stated to be 0 so that AND gate 12 is disabled. Therefore, OR gate 1T1 is disabled and $y_2=\mathbf{0}$. $x_3$ was stated to be a 1. Therefore, the pulse TP–1 causes $RO_3$ to occur. But, the $x_3=\mathbf{1}$ signal causes all of the $y$'s of equal or greater rank than $x_3$ to be 1 and these $y$ signals ($y_3 \ldots y_{26}$) disable all AND gates in groups &2 . . . &9.

When the $RO_3=\mathbf{1}$ signal occurs, the register associated with $RO_3$ is read out. Upon completion of the read-out, $x_3$ changes to 0. By this time, the second TP–1 signal has terminated and all AND gates are again disabled.

In a manner similar to that discussed above, it can be shown that the third TP–1 pulse causes $RO_6$ to appear and the fourth causes a signal $RO_{25}$ to appear. After the fourth TP–1 timing pulse, all of the active lines (only those carrying the signals $x_1$, $x_3$, $x_6$, $x_{25}$ were active) have been selected and all of the $x$'s are 0.

In the system of FIG. 7, the signal $x_1^{(1)}$, which is also legended "local 1," is equal to the OR function $x_1+x_2+x_3$. In a similar manner, the signal $x_2^{(1)}$ is equal to the OR function $x_4+x_5+x_6$. The signal $y_2^{(1)}$ is the OR function of both "local 1" and "local 2." The signal $x_1^{(2)}$ is the OR function of local 1 . . . local 3, that is, $x_1+x_2 \ldots +x_9$. Accordingly, this line is labeled CUM (cumulative) 1–3 (groups 1, 2 and 3).

In general, the higher an OR gate is in its column, the greater the number of $x$'s its output is a function of. The highest OR gate, namely, OR gate 1W3 in column 3, produces the OR function which is the cumulative function of groups 1–9 or, in other words, the cumulative OR function of $x_1$ through $x_{27}$. Therefore, the output of gate 1W3 is indicative of whether or not any input line still remains active. If this output is a 1 when a TP–1 pulse occurs, at least one input line is active. If it is a 0 when a TP–1 pulse occurs, all input lines are inactive.

In the system of FIG. 7, no OR gate receives more than three inputs. Moreover, no OR gate fans-out to more than three other stages. If additional, fan-out is required, an amplifier should be inserted. For example, amplifier 1S2 is inserted, as the output of gate 1W2 is required ot fan-out to 5 stages, namely, 2R2, 2S2, 2T2, 1T2 and 1W3. The delay time added to effect this reduction in fan-in/fan-out requirements, is relatively small. The maximum delay of the system, that is, the maximum time between the selection of an active line and the generation of the corresponding $y$ signal, is five stages of delay.

A more detailed discussion of the selector circuit of FIG. 7 and its uses may be found in application Serial No. 274,089, titled "Logic Circuits," filed April 19, 1963, now U.S. Patent No. 3,239,689, issued on March 8, 1966, by the present applicant, Robert O. Winder.

The system of the present invention is also useful when embodied in a carry generator for an adder. In this carry generator, the carries are calculated directly from the inputs rather than by "carry ripple." The advantage of this carry generator is its inherently higher speed in view of the fewer stage delays needed to generate the higher order carries. If one assumes an end-around carry $c_0$, then the successive carries are functions of the two words $(x_1x_2 \ldots x_n)$ and $(y_1y_2 \ldots y_n)$ being added, and also of $c_0$. The functions formally are $$c_1=x_1y_1+(x_1+y_1)c_0 \qquad (41)$$

$$c_2=x_2y_2+(x_2+y_2)c_1 \qquad (42)$$

$$\vdots$$

$$c_n=x_ny_n+(x_n+y_n)c_{n-1} \qquad (43)$$

Put into words, the equations above say that a carry such as $c_1$ is present when the two corresponding bits of the words being added $x_1$ and $y_1$ are both present or when $x_1$ and $c_0$ are both present, or when $y_1$ and $c_0$ are both present.

Let $E_i$ be a ternary variable whose 3 values −1, 0 and +1 respectively represent "propagate no carry"; "propagate if carry is present"; and "propagate a carry." Then, $E_i$ can be expressed in terms of $x$ and $y$ as follows:

$$E_i=\begin{cases}-1 \text{ if } x_i=y_i=0 & (44)\\ 0 \text{ if } x_i=1,\ y_i=0 & (45)\\ 0 \text{ if } x_i=0,\ y_i=1 & (46)\\ +1 \text{ if } x_i=y_i=1 & (47)\end{cases}$$

Again, put into words, the equations above say that if $x_i$ and $y_i$ are both a 0, then no output carry will be propagated (that is, $c_i=0$) regardless of whether the input carry $c_{i-1}$ is a 1 or a 0. If $x$ is a 1 and $y$ is a 0, or if $x$ is a 0 and $y$ is a 1, the carry generated is the same value as the input carry. Finally, if $x$ and $y$ are both 1, then the carry $c_i=1$ is generated regardless of the value of the input carry.

If two adjoining stages $i$ and $i+1$ are considered, their combined effect on the propagated carry may be calculated. The combination is expressed as $E_i*E_{i+1}$, where $E_{i+1}$ represents the more significant of the two variables. The equations are:

$$E_i*E_{i+1}=\begin{cases}-1 \text{ if } E_{i+1}=-1 & (48)\\ E_i \text{ if } E_{i+1}=0 & (49)\\ +1 \text{ if } E_{i+1}=+1 & (50)\end{cases}$$

Again, in words, the above equations say that if $E_{i+1}$ is a $-1$, that is, if both $x_{i+1}$ and $y_{i+1}$ are 0, then regardless of whether the input carry is a 1 or 0 (that is, regardless of whether $E_i$ is $-1$, 0 or $+1$) then no carry is generated, that is, $E_i*E_{i+1}=-1$. In a similar manner the Equations 49 and 50 can be seen also to be correct.

The function defined by Equations 48, 49 and 50 is associative and, therefore, a carry generator system utilizing the network of associative gates, already described in general terms, may be employed for the carry generator. In such a network, each input ($x$ in the figures discussed so far), however, must carry a ternary signal rather than a binary signal. The inputs are the $E_i$ defined above. The outputs (they are hereafter termed $H_i$) specify the carry which is generated for the $i$th bit of the sum word. H may be defined as follows:

$$H_i=\begin{cases}+1, \text{ the carry } c_i=1 & (51)\\ 0, \text{ the carry } c_i=c_0 & (52)\\ -1, \text{ the carry } c_i=0 & (53)\end{cases}$$

One could possibly employ a three level signal to represent a ternary quantity. However, in the approach adopted here, the ternary quantity is represented by binary signals on two wires. In particular, the first $E_i$ is represented by the two binary variables $x_1$ and $y_1$. It will be shown shortly that the identification of the E variables with the original input variables is consistent. The correspondence between $E_i$ and $x_i$ and $y_i$ is given in the table below.

| $x_i$ | $y_i$ | $E_i$ |
|---|---|---|
| 0 | 0 | −1 |
| 0 | 1 | 0 |
| 1 | 0 | 0 |
| 1 | 1 | +1 |

From the table above, it may be seen that 2 of the 4 possible states $x_i$, $y_i$ are identical with one state of $E_i$.

The rule of combination $E_i*E_{i+1}$ may be converted into a rule of combination for the corresponding $(x_i, y_i)$ and $(x_{i+1}, y_{i+1})$. The two binary bits representative of $E=E_i*E_{i+1}$ may be termed $x$ and $y$. Then, because of the redundancy of coding, several rules of combination are possible. The following one is chosen:

$$x=x_{i+1}y_{i+1}+(x_{i+1}+y_{i+1})x_i \qquad (54)$$

$$y=x_{i+1}y_{i+1}+(x_{i+1}+y_{i+1})y_i \qquad (55)$$

Note that if $x_{i+1}=y_{i+1}=1$, (i.e., $E_{i+1}=+1$) then $x=y=1$ (i.e., $E=+1$). If $x_{i+1}=y_{i+1}=0$, (i.e., $$E_{i+1}=-1)$$

then $x=y=0$ (i.e., $E=-1$). And if $x_{i+1}=0$, $y_{i+1}=1$, or if $x_{i+1}=1$, $y_{i+1}=0$ (i.e., $E_{i+1}=0$) then $x=x_i$, $y=y_i$ (i.e., $E=E_i$). These two functions of two pairs of variables may be written in the form:

$$(x, y)=(x_i, y_i)*(x_{i+1}, y_{i+1}) \qquad (56)$$

By definition, these functions can be realized by 3-input majority gates. Furthermore, the many-input * gate can also be realized by two majority gates: For instance, the functions $$(x, y)=(x_i, y_i)*(x_{i+1}, y_{i+1})*(x_{i+2}, y_{i+2}) \qquad (57)$$

are realized by $$x=\text{maj }(2x_{i+2}, 2y_{i+2}, x_{i+1}, y_{i+1}, x_i) \qquad (58)$$

$$y=\text{maj }(2x_{i+2}, 2y_{i+2}, x_{i+1}, y_{i+1}, y_i) \qquad (59)$$

In the equations above, "maj" means that the output is logically equal to the majority of the inputs; the factor "2" means that the corresponding input has "two votes" (or a weight of two) in determining the majority. The gate used is a 2+2+1+1+1=7 input majority gate.

In general, if $$(x, y)=(x_i, y_i)*(x_{i+1}, y_{i+1})* \ldots *(x_{i+m-1}, y_{i+m-1}) \qquad (60)$$

then $$x=\text{maj }(2^{m-2}x_{i+m-1}, 2^{m-2}y_{i+m-1}, 2^{m-3}{}_{ix+m-2}, 2^{m-3}y_{i+m-2}, \ldots, 2x_{i+2}, 2y_{i+2}, x_{i+1}, y_{i+1}, x_i) \qquad (61)$$

$y=\text{maj}$ (same arguments, with $y_i$ substituted $x_i$) (61*a*)

and majority gates with $(2^{m-1})$ inputs are used (although the inputs can be grouped together in which case only $(2^{m-1})$ weighted inputs are required).

The relationship between the general associative gates and the majority gates for calculating carry functions specifically (arranged in the same network) is shown in FIGS. 8, 9 and 10. In the arrangement of FIG. 8 $m=2$, $k=1$ and $n=5$. So that the correspondence among figures may be more evident, the positions of the gates have been changed. However, their connection is exactly the same as already discussed. The gates may be identified by the legends applied to the gates. Thus, FIG. 8 may be compared with FIG. 5. In FIG. 8, the gates W are shown to the left whereas the gate W is the uppermost furthest right gate in a group in FIG. 5. The gates S and T are shown to the right of gate W in FIG. 8, whereas in FIG. 5 they are beneath and to the left of gate W.

FIG. 9 shows majority gate pairs substituted for the more general associative gates. It may be observed that the block 1W1 now consists of two gates 20 and 22. These two gates receive as inputs the two ternary variables $x_1y_1$ and $x_2y_2$, respectively, which correspond to the two binary variables $x_1$ and $x_2$, respectively, of FIG. 8. In FIG. 9, the two gates 1W1 supply an output to both the gate pairs 1S1 and to the gate pair 2S1. Correspondingly, in FIG. 8 the gate 1W1 supplies an output to both the gates 1S1 and 2S1 (however, the gates are now single gates). The comparison between the remainder of the gates of FIG. 8 and FIG. 9 should be self-evident. The reason that 2 wires are required in FIG. 9 each place that there is 1 wire in FIG. 8, is that in the circuit of FIG. 9 the variable is a ternary quantity, whereas in FIG. 8 the variable is in binary quantity.

The end-around carry is not shown in FIG. 9. In FIG. 10 the end-around carry $c_0$ is shown and it is made equal to the ternary input $x_1y_1$. This is done to effect a substantial saving in equipment (more than 25%) and also to simplify (in most cases) the final sum calculation.

The bits $x_1y_1$ are the least significant bits, the general rule being that the $c_0$ lead replaces the 2 leads for the least significant $x$ and $y$ bits. The reason that equipment is saved with the circuit arranged in this way is that many of the majority gates within the dashed blocks then receive identical inputs. For example, the majority gates 20 and 22 of FIG. 9 now both receive the same inputs, namely, $c_0$, $x_2$, $y_2$. Therefore they each produce the same output and one may be eliminated. It may also be seen in FIG. 10 that the two gates 1T1 of FIG. 9 become the one gate of 1T1 of FIG. 10. The two gates 2T1 of FIG. 10 become the one gate 2T1 of FIG. 10 and so on. One additional change is that the outputs are now binary outputs H. These are quite suitable and in the overall system represent the actual value of carry which is generated.

The majority gates shown in FIGS. 9 and 10 are 3 input majority gates. Each of the inputs is the same weight.

In a practical circuit, the least significant bits of the two words actually being added correspond to $x_2$, $y_2$ of FIG. 10. This is to permit the reduction in the number of gates discussed. However, in the practical circuits these least significant bits $x_2$, $y_2$ of FIG. 10 are, in fact, legended $x_1$, $y_1$.

Before going to the carry generator of the invention, the more generalized showing of the associative gates should be referred to. It appears in FIG. 6. The circuit may be redrawn as shown in FIG. 11. The interconnections of the gates in FIG. 6 and FIG. 11 are identical. However, the positions of the gates have been changed. The gates are all identified in the manner shown in the figure so that the correspondence between FIGS. 6 and 11 may more easily be seen.

One carry generator embodying the invention is shown in FIG. 12. The binary words being added each have 18 bits, namely, $x_1$–$x_{18}$ is added to $y_1$–$y_{18}$. In addition, there is an end-around carry $c_0$. The majority gates employed have a maximum fan-in/fan-out $m$ equal to 4. However, this requires further explanation. $m=4$ here represents 4 ternary inputs. Each ternary quantity, of course, has 3 possible states $-1$, 0 and $+1$. In actuality, the greatest number of input leads to a gate is 7. For example, gate 1W1 receives the input variables $c_0$, $x_1$, $x_2$, $x_3$ and $y_1$, $y_2$, $y_3$. Moreover, the inputs to the gates are weighted as shown in the legend. Thus, in the case of a 7-input gate, the two bits of highest significance $x_n$ and $y_n$ each carry a weight of 4. The two bits of next significance $x_{n-1}$ and $y_{n-1}$ each carry a weight of 2 and the remaining bits $x_{n-2}$, $y_{n-2}$ and $x_{n-3}$ or $x_{n-2}$, $y_{n-2}$ and $y_{n-3}$ each carry the weight of 1. This majority gate therefore may be considered to be a 15-input majority gate. It might be mentioned that this gate is practical and gates having 31 inputs have, in fact, been built and successfully operated.

To continue, some of the gates have fewer than 7 inputs. For example, the gate 2S1 has 5 inputs. The two most significant inputs (here $x_5$ and $y_5$) each carry a weight of 2 and the remaining inputs each carry a weight of 1. Finally, some of the gates such as 1S1 have only 3 inputs. In such gates, the inputs are each weighted equally, that is, they each carry a weight of 1.

The operation of the adder of FIG. 12 can be traced by assuming various input binary bits and a particular end-around carry binary bit $c_0$. It can readily be shown that the circuit does, in fact, generate carries. In general, for a given $m$ and $k$, the maximum number of bits which can be handled is $$n=m^{k+1}+m^{k-2} \qquad (62)$$

The maximum number of delay intervals $d$, assuming one interval per stage, is $$d=2k+1 \qquad (63)$$

In the circuit of FIG. 12, the maximum delay $d=3$ and $k=1$. The total number of stages G required (including amplifiers) is approximately $$G=n\left(1+\frac{3}{m-1}-\frac{1}{m}\right)-4k-2-\frac{2}{m} \qquad (64)$$

A second carry generator embodying the invention is shown in FIG. 13. In this carry generator, the $x$ and $y$ words each have 22 bits and, in addition, there is an end-around carry input $c_0$. The fan-in/fan-out number $m$ is 2, that is, 2 ternary numbers. In actuality, each majority gate is capable of receiving a maximum of 3 inputs as, for example, $x_3$, $y_3$, $x_2$. The various inputs all have the same weight. $k=3$ so that there are 4 levels in the tree. The gate 1W1 consists of 1 majority gate, whereas the stages 2W1 through 11W1 each consist of 2 majority gates. In a similar manner, the majority gate 1W2 consists of 1 gate, whereas 2W2 through 5W2 each consist of 2 gates. The stage 2W3 consists of 2 gates and all remaining stages in the system are either single amplifiers or single majority gates.

FIG. 14 shows the same circuit as FIG. 13 but with the gates arranged in columns 1, 2, 3 and 4. The purpose of FIG. 14 is to enable the reader more easily to see the correspondence between the adder of FIG. 13 and the generalized associative gate arrangement such as, for example, appears in FIG. 4. To simplify the drawing, the carries which are generated and most of the signals propagating from right to left, are not shown in FIG. 14. These appear, however, in FIG. 13.

As in the case of the adder of FIG. 12, the operation of the circuit can readily be followed by assuming appropriate values for the 2 input words and the end-around carry $c_0$. The maximum number of delays inserted in the carry generator of FIG. 13 is that produced by 7 stages. This follows also from Equation 63, since $k=3$.

The particular adder employed, in each case, will depend upon engineering requirements such as cost, availability of particular gates, speed desired, and so on. In general, the greater the fan-in, fan-out number $m$, the higher the operating speed, but, generally speaking, the more expensive the individual gates.

The table below gives other examples of delays $d$, total number of gates G and so on for networks made up of majority gates in which $m$=2, 3, 4 and 5, and in which $n$ equals various numbers from 4 through 190. It should be kept in mind that for $m$=2, 3-input majority gates are required; for $m$=3, 7-input majority gates are required; for $m$=4, 15-input majority gates are required; and for $m$=5, 31-input majority gates are required. It should also be remembered that the gates are weighted gates, that is, certain of the inputs have a greater vote in determining what the decision should be than other inputs. As an example, in FIG. 12, if $x_n$ and $y_n$ are both 1, then the majority gate shown in the legend produces a 1 output regardless of the values of the other variables $x$, since there are at least 8 out of 15 votes to produce a 1. Similarly, if the $x_n$, $x_{n-1}$ and $y_{n-1}$ are all 1, again, the majority gate produces a 1 output even if the remaining 4 inputs $y_n$, $x_{n-2}$, and $x_{n-3}$ are 0. Further, in the case of $m$=2, the inputs to the gates are all weighted equally. In the case of $m$=3 and 4, the inputs are weighted in the manner already indicated. In the case of $m$=5, the most significant 2 inputs each carry a weight of 8, the two inputs of next significance carry a weight of 4, the two inputs of next significance carry a weight of 2, and the remaining three bits carry a weight of 1.

| m | 2 | | | | | | 3 | | | 4 | | 5 | |
|---|---|---|---|---|---|---|---|---|---|---|---|---|---|
| n | 4 | 10 | 22 | 46 | 94 | 190 | 10 | 34 | 106 | 18 | 78 | 28 | 148 |
| k | 1 | 2 | 3 | 4 | 5 | 6 | 1 | 2 | 3 | 1 | 2 | 1 | 2 |
| d | 3 | 5 | 7 | 9 | 11 | 13 | 3 | 5 | 7 | 3 | 5 | 3 | 5 |
| G | 7 | 24 | 62 | 142 | 306 | 638 | 15 | 63 | 215 | 25 | 126 | 37 | 219 |

The systems shown in FIGS. 12–14 are the carry generator portions of full adders. It should be appreciated that it is, of course, also of interest to generate the sum. However, the sum generating circuit, per se, made up of majority gates, is well known and is not part of the present invention. Such circuits are discussed for example in M. Cohn and R. Lindaman, "Axiomatic Majority-Decision Logic," IRETEC, vol. EC–10, pp. 17–21, March 1961 and M. S. Miller and R. O. Winder, "Majority Logic Synthesis By Geometric Methods," IRETEC, vol. EC–11, pp. 89–90, February 1962.

FIG. 16 is a generalized showing of a network of associative gates according to the present invention. $m$ is any arbitrary number, $n$ is any arbitrary number and $k$ will depend upon the values of $n$ and $m$ as indicated in Equation 6*c*. The stages within each group appear in FIG. 15. As noted in FIG. 15, gate P may be omitted from the top group in each column except the last column. Amplifier I is omitted from group 1 of each column. Lines Q are omitted from group 1 of each column. Amplifier I is substituted for gate I+1 in group 1 of each column. The amplifier I may be deleted from all groups in column 1 if not needed for fan-out purposes.

In the claims which follow it is to be understood that the degenerate case in which $m=1$, is excluded.

What is claimed is:

1. In combination, (1) a source of $n$ input signal representations indicative of $n$ original input digits in a given order;

(2) $k+1$ columns of a given type of associative gate means, each said column except the last column having at least $$\left[\frac{g_j}{m}\right]+1$$

groups of such gate means, and the last column having one such group of gate means, each group receiving inputs of successive rank, where $g_j=n$ in the case of the first column and is equal to the number of input signal representations received from the preceding column in each other case, (a) the first group in each column having not more than $m-1$ such gate means, (b) the last group in each column having $g_j-t_j$ such gate means, where $t_j$=the number of input signal representations applied to the remaining groups in said column, and $g_j-t_j$ is not greater than $m-1$, and (c) the remaining groups in each column each having not more than $m$ gate means;

(d) the last said group in the first column receiving $g_j-t_j$ signal representations representing the most significant $g_j-t_j$ of the $n$ input digits, and the last group of each succeeding column receiving the $g_j-t_j$ signal representations representing the most significant $g_j-t_j$ output signal representations of the immediately preceding column, and (e) the remaining groups in the first column each receiving no more than $m$ of the $n$ input signal representations, and the remaining groups in each succeeding column each receiving no more than $m$ output signal representations of the immediately preceding column;

(f) each group for producing a first output signal representation indicative of the associative function of the digits $x_{im+p} \ldots x_{im+1}$ represented by all of the original input signal representations to said group in the case of a group in the first column, and by all of the input signal representations to said group from the preceding column in the case of a group in another column, and which first output signal representation each group except the single group in the last column applies to the immediately succeeding column, said single group in the last column applying its first output signal representation to the preceding column, and each group for producing other output signal representations indicative of the associative function of $x_{im+p-1} \ldots x_{im+1}$ and $y_i$ through the associative function of $x_{im+1}$ and $y_i$, where $y_i$ is a cumulative digit indicative of the associative function of all inputs to lower ranking groups in its column, which cumulative digit is represented by a signal representation said group receives from the immediately succeeding column; said other output signal representations being applied to the immediately preceding column in each case except that of the first column, $g_j$, $n$, $m$, $k$, $i$, $p$, and $t_j$ are all integers, $m$ is less than $n$ but greater than 1 and is the maximum fan-in permitted per gate and is not more than the fan-out which is possible from a gate, a fraction within brackets [ ] represents the largest whole number obtained when the numerator is divided by the denominator of the fraction, $k$ is at least equal to $$\left[\log_m \frac{n+1}{m+1}\right]$$

and the term "associative gate means" refers to a gate means which receives a plurality of input signal representations representing digits and which produces an output indicative of a particular logic function of the digits represented by the input signal representations and whose value is independent of the manner of grouping the input signal representations.

2. In the combination set forth in claim 1, said input signal representations indicative of $n$ original input digits comprising signal representations indicative of $n$ ternary digits, wherein each ternary digit has one of three values, the first of which indicates that a carry should be generated, the second of which indicates that a carry may be generated, and the third of which indicates that a carry should not be generated, and wherein each associative gate means comprises means responsive to an ordered plurality of such signal representations indicative of ternary digits for producing an output signal representation having one of three values, the first of which indicates that a carry should be generated and which occurs when the most significant input signal representation to that gate means other than one having said second value has said first value, the second of which indicates that a carry may be generated and which occurs when all input signal representations to that gate means have said second value, and the third of which indicates that a carry should not be generated and which occurs when the most significant input signal representation to that gate means other than one having said second value has said third value.

3. In the combination set forth in claim 1, each signal representation consisting of a single signal indicative of a binary digit.

4. In the combination set forth in claim 1, each signal representation consisting of two signals which together represent a ternary digit.

5. In the combination set forth in claim 1, each gate means comprising an OR gate.

6. In a network of associative gate means:

(a) a source providing at least $m+p$ signals indicative of $m+p$ digits respectively, each digit of different rank, where $p$ is at least equal to $m$ and where the $m$ digits are the most significant of said $m+p$ digits;

(b) a group of $m$ associative gate means, where $m$ is an integer greater than 1 and is the maximum fan-in and is not more than the fan-out permitted for a gate means;

(c) means for applying to the last gate means, that is, the $m$th gate means of the group, the $m$ signals indicative of the $m$ most significant of said $m+p$ digits;

(d) means for applying to each succeeding gate means in the group one less of said $m$ signals than to the previous gate means, ranging from the application of the $m+p-1$th through the $p+1$th signals to the $m-1$th gate means to the application only of the $p+1$th signal to the first gate means;

(e) means for producing a signal indicative of the associative function of the $p$ least significant of said $m+p$ digits and applying the same to said $m-1$th through said first gate means; and (f) an output terminal at each associative gate means at which an output signal is produced which is indicative of the associative function of the digits represented by all of the input signals to that gate means where:

the term "associative gate means" refers to a gate means which receives a plurality of input signals representing binary digits and which produces an output indicative of a particular logic function of the digits represented by said input signals and whose value is independent of the manner of grouping said input signals.

7. In a network of associative gate means:

(a) a source providing at least $m+p$ signals indicative of $m+p$ digits respectively, each digit of different rank, where $p$ is at least equal to $m$ and where the $m$ digits are the most significant of said $m+p$ digits;

(b) a group of $m$ associative gate means, where $m$ is an integer greater than 1 and is the maximum fan-in and not more than the fan-out permitted for a gate means;

(c) means for applying to the last gate means, that is, the $m$th gate means of the group, the $m$ signals indicative of the $m$ most significant of said $m+p$ digits;

(d) means for applying to each succeeding gate means in the group one less of said $m$ signals than to the previous gate means, ranging from the application of the $m+p-1$th through the $p+1$th signals to the $m-1$th gate means to the application only of the $p+1$th signal to the first gate means;

(e) an amplifier;

(f) means for producing a signal indicative of the associative function of the $p$ least significant of said $m+p$ digits and applying the same to said $m-1$th through said first gate means and to said amplifier; and (g) an output terminal at each associative gate means at which an output signal is produced which is indicative of the associative function of the digits represented by all of the input signals to that gate means where:

the term "associative gate means" refers to a gate means which receives a plurality of input signals representing binary digits and which produces an output indicative of a particular logic function of the digits represented by said input signals and whose value is independent of the manner of grouping said input signals.

8. In a network of associative gate means:

(a) a source providing at least $m+p$ signals indicative of $m+p$ digits respectively, each digit of different rank, where $p$ is at least equal to $m$ and where the $m$ digits are the most significant of said $m+p$ digits;

(b) a group of $m$ associative gate means, where $m$ is an integer greater than 1 and is the maximum fan-in and not more than the fan-out permitted for a gate means;

(c) means for applying to the last gate means, that is, the $m$th gate means of the group, the $m$ signals indicative of the $m$ most significant of said $m+p$ digits;

(d) means for applying to each succeeding gate means in the group one less of said $m$ signals than to the previous gate means, ranging from the application of the $m+p-1$th through the $p+1$th signals to the $m-1$th gate means to the application only of the $p+1$th signal to the first gate means;

(e) an amplifier;

(f) another means having the structure at least of that set forth in (*a–d*) for producing a signal indicative of the associative function of the $p$ least significant of said $m+p$ digits and applying the same to said $m-1$th through said first gate means and to said amplifier; and (g) an output terminal at each associated gate means at which an output signal is produced which is indicative of the associative function of the digits represented by all of the input signals to that gate means where:

the term "associative gate means" refers to a gate means which receives a plurality of input signals representing binary digits and which produces an output indicative of a particular logic function of the digits represented by said input signals and whose value is independent of the manner of grouping said input signals.

No references cited.

MALCOLM A. MORRISON, *Primary Examiner.*

ROBERT C. BAILEY, *Examiner.*

I. J. FAIBISCH, M. P. HARTMAN, *Assistant Examiners.*

UNITED STATES PATENT OFFICE
CERTIFICATE OF CORRECTION

Patent No. 3,308,285 March 7, 1967

Robert O. Winder

It is hereby certified that error appears in the above numbered patent requiring correction and that the said Letters Patent should read as corrected below.

Column 3, line 5, for "illusrated" read -- illustrated --; column 4, line 59, for "$=x_{im+}*$" read -- $=x_{im+1}*$ --; column 6, line 10, for "(Recall that the $x_i^{(1)}$." read -- (Recall that the $x_i^{(1)}$ were defined from the original $x_i$, which can be considered, then, $x_i^{(0)}$). --; column 8, line 36, for "ot" read -- to --; column 9, in the table, for the headings "xi yi Ei" read -- $x_i$ $y_i$ $E_i$ --; column 14, line 14, after "column" insert -- where --.

Signed and sealed this 25th day of June 1968.

(SEAL)
Attest:

EDWARD M.FLETCHER,JR.
Attesting Officer

EDWARD J. BRENNER
Commissioner of Patents